(12) United States Patent
Kim et al.

(10) Patent No.: US 11,631,406 B2
(45) Date of Patent: Apr. 18, 2023

(54) METHOD FOR RESPONDING TO USER UTTERANCE AND ELECTRONIC DEVICE FOR SUPPORTING SAME

(71) Applicant: Samsung Electronics Co., Ltd., Gyeonggi-do (KR)

(72) Inventors: Yongho Kim, Gyeonggi-do (KR); Taeksoo Chun, Gyeonggi-do (KR); Sunah Kim, Gyeonggi-do (KR); Boram Lee, Gyeonggi-do (KR); Kyoungsun Cho, Gyeonggi-do (KR); Gahyun Joo, Gyeonggi-do (KR)

(73) Assignee: Samsung Electronics Co., Ltd.

( * ) Notice: Subject to any disclaimer, the term of this patent is extended or adjusted under 35 U.S.C. 154(b) by 218 days.

(21) Appl. No.: 16/960,764

(22) PCT Filed: Jan. 21, 2019

(86) PCT No.: PCT/KR2019/000816
§ 371 (c)(1),
(2) Date: Jul. 8, 2020

(87) PCT Pub. No.: WO2019/146970
PCT Pub. Date: Aug. 1, 2019

(65) Prior Publication Data
US 2020/0349947 A1 Nov. 5, 2020

(30) Foreign Application Priority Data
Jan. 25, 2018 (KR) .................. 10-2018-0009045

(51) Int. Cl.
*G10L 15/22* (2006.01)
*G06F 1/3231* (2019.01)
(Continued)

(52) U.S. Cl.
CPC ............ *G10L 15/22* (2013.01); *G06F 1/3231* (2013.01); *G06F 1/3293* (2013.01); *G06F 3/167* (2013.01);
(Continued)

(58) Field of Classification Search
USPC ........................ 704/246, 247, 251, 252, 275
See application file for complete search history.

(56) References Cited

U.S. PATENT DOCUMENTS 8,571,528 B1 * 10/2013 Channakeshava .. H04M 1/2757
455/414.1
10,643,609 B1 * 5/2020 Pogue ...................... G10L 15/18
(Continued)

FOREIGN PATENT DOCUMENTS

JP          2011118822        6/2011
KR      1020150095624        8/2015
(Continued)

OTHER PUBLICATIONS

PCT/ISA/210 Search Report issued on PCT/KR2019/000816, dated May 15, 2019, pp. 5.
(Continued)

*Primary Examiner* — Leonard Saint-Cyr
(74) *Attorney, Agent, or Firm* — The Farrell Law Firm, P.C.

(57) ABSTRACT

In an embodiment of the disclosure, disclosed is an electronic device including a communication module, a microphone, a first and a second wake-up recognition module, a memory, and a processor. The processor is configured to receive a first user utterance through the microphone, recognize the first user utterance based on at least one of the first or the second wake-up recognition module, when the recognized first user utterance includes specified at least one first trigger information, record at least part of the first user
(Continued)

utterance by activating the recording function, transmit recorded data to an external device, and receive at least one of second user utterance information, which is predicted to occur at a time after the function of the speech recognition service is activated by the first wake-up recognition module, or at least one response information associated with the second user utterance from the external device.

11 Claims, 18 Drawing Sheets

(51) Int. Cl.
    *G06F 1/3293*     (2019.01)
    *G06F 3/16*     (2006.01)
    *G10L 15/08*     (2006.01)
    *G10L 15/30*     (2013.01)

(52) U.S. Cl.
    CPC .............. *G10L 15/08* (2013.01); *G10L 15/30* (2013.01); *G10L 2015/088* (2013.01); *G10L 2015/223* (2013.01)

(56) References Cited

U.S. PATENT DOCUMENTS

| | | | |
|---|---|---|---|
| 2010/0098231 | A1 | 4/2010 | Wohlert |
| 2015/0012279 | A1* | 1/2015 | Kim .................. G10L 25/48 |
| | | | 704/275 |
| 2015/0045003 | A1 | 2/2015 | Vora et al. |
| 2016/0293168 | A1* | 10/2016 | Chen .................. G10L 15/22 |
| 2017/0068513 | A1 | 3/2017 | Stasior et al. |
| 2018/0143867 | A1* | 5/2018 | Meredith .............. G06Q 10/10 |
| 2018/0247647 | A1* | 8/2018 | Zhang .................. G10L 15/22 |
| 2019/0066680 | A1* | 2/2019 | Woo .................... G10L 15/22 |
| 2019/0073999 | A1* | 3/2019 | Prémont .............. G10L 15/32 |

FOREIGN PATENT DOCUMENTS

| | | |
|---|---|---|
| KR | 1020160040279 | 4/2016 |
| KR | 1020170084551 | 7/2017 |
| KR | 1020170124852 | 11/2017 |

OTHER PUBLICATIONS

PCT/ISA/237 Written Opinion issued on PCT/KR2019/000816, dated May 15, 2019, pp. 4.

\* cited by examiner

METHOD FOR RESPONDING TO USER UTTERANCE AND ELECTRONIC DEVICE FOR SUPPORTING SAME

PRIORITY

This application is a National Phase Entry of PCT International Application No. PCT/KR2019/000816 which was filed on Jan. 21, 2019, and claims priority to Korean Patent Application No. 10-2018-0009045, which was filed on Jan. 25, 2018, the content of each of which is incorporated herein by reference.

TECHNICAL FIELD

Various embodiments disclosed in this specification relate to a technology for reducing a response time for a user utterance.

BACKGROUND ART

For the purpose of aiming interaction with a user, recent electronic devices have suggested various input methods. For example, an electronic device may support a voice input method that receives voice data according to user speech, based on the execution of a specified application program. Furthermore, the electronic device may recognize the received voice data to derive the intent of a user utterance and may perform a task corresponding to the derived intent of the user utterance or support a speech recognition service for outputting content.

DISCLOSURE

Technical Problem

To recognize voice data according to a user utterance, a series of processes of analyzing information resources on the voice data based on a linguistic model or algorithm may be involved. Therefore, it may take a predetermined time for an electronic device to provide a response (e.g., task execution, content output, or the like) corresponding to the intent of the user utterance, which will be understood as a user's waiting time for the response of the electronic device. However, the response waiting time as described above may act as an obstacle to the user's perception that user utterance (or voice data) is being processed normally and may reduce the reliability of the operation of the speech recognition service.

Various embodiments disclosed in this specification may provide a user utterance response method capable of reducing a user's response waiting time and an electronic device supporting the same, by predicting a user utterance to prepare at least part of a response corresponding to a user utterance in advance and providing the prepared response when the predicted user utterance occurs.

Technical Solution

According to an embodiment, an electronic device supporting a speech recognition service may include a communication module communicating with at least one external device, a microphone receiving a voice input according to a user utterance, a first wake-up recognition module activating a function of the speech recognition service, a second wake-up recognition module activating a recording function for the user utterance, a memory storing at least one trigger information associated with activation of the function of the speech recognition service or the recording function, and a processor electrically connected to the communication module, the microphone, the first wake-up recognition module, the second wake-up recognition module, and the memory.

According to an embodiment, the processor may be configured to receive a first user utterance through the microphone, to recognize the first user utterance based on at least one of the first wake-up recognition module or the second wake-up recognition module, when the recognized first user utterance includes specified at least one first trigger information, to record at least part of the first user utterance by activating the recording function, to transmit recorded data to an external device supporting an operation of the speech recognition service, and to receive at least one response information associated with a second user utterance, which is predicted to occur at a time after the function of the speech recognition service is activated by the first wake-up recognition module, from the external device to store the at least one response information.

According to an embodiment, a user utterance response method of an electronic device supporting a speech recognition service may include receiving a first user utterance through a microphone, recognizing the first user utterance, when the recognized first user utterance includes specified at least one first trigger information, recording at least part of the first user utterance, by activating a recording function included in the electronic device, transmitting the recorded data to an external device supporting an operation of the speech recognition service, and receiving at least one response information associated with a second user utterance, which is predicted to occur at a time after the function of the speech recognition service is activated, from the external device to store the at least one response information.

Advantageous Effects

According to various embodiments, the response speed of an electronic device for a user utterance may be improved.

According to various embodiments, the sense of incongruity to the operation of the speech recognition service may be reduced, or the reliability may be improved, by reducing the waiting time for a user's response.

Besides, a variety of effects directly or indirectly understood through the disclosure may be provided.

DESCRIPTION OF DRAWINGS

With regard to the description of drawings, the same reference numerals may be assigned to the same or corresponding components.

MODE FOR INVENTION

Figure 1A:
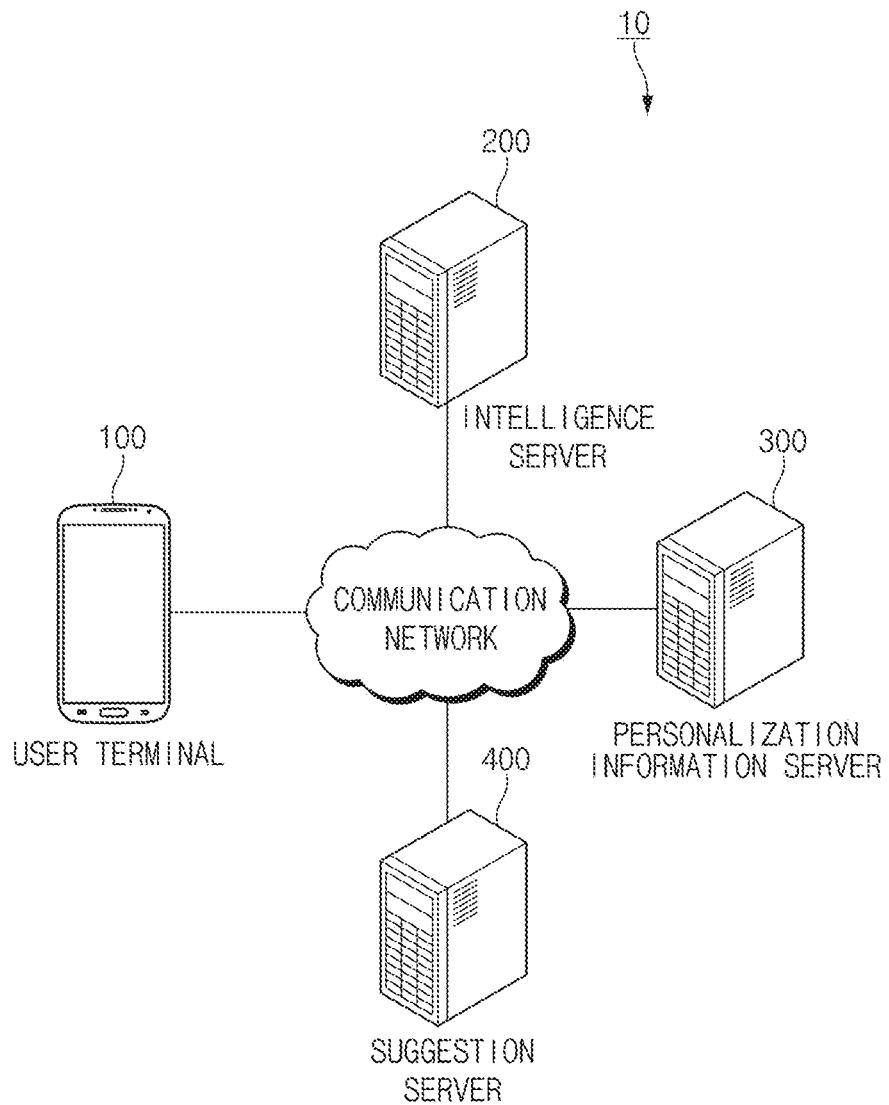
FIG. 1A is a diagram illustrating an integrated intelligence system, according to an embodiment.

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure. With regard to description of drawings, similar components may be marked by similar reference numerals.

In the disclosure, the expressions "have", "may have", "include" and "comprise", or "may include" and "may comprise" used herein indicate existence of corresponding features (e.g., components such as numeric values, functions, operations, or parts) but do not exclude presence of additional features.

In the disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the disclosure may be used to refer to various components regardless of the order and/or the priority and to distinguish the relevant components from other components, but do not limit the components. For example, "a first user device" and "a second user device" indicate different user devices regardless of the order or priority. For example, without departing the scope of the disclosure, a first component may be referred to as a second component, and similarly, a second component may be referred to as a first component.

It will be understood that when a component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when a component (e.g., a first component) is referred to as being "directly coupled with/to" or "directly connected to" another component (e.g., a second component), it should be understood that there are no intervening component (e.g., a third component).

According to the situation, the expression "configured to" used in the disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the disclosure are used to describe specified embodiments and are not intended to limit the scope of the disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of the disclosure. In some cases, even if terms are terms which are defined in the disclosure, they may not be interpreted to exclude embodiments of the disclosure.

An electronic device according to various embodiments of the disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs)), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyro-compasses), avionics, security devices, head units for vehicles, industrial or home robots, automated teller machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of the disclosure may not be limited to the above-described electronic devices and may include other electronic devices and new electronic devices according to the development of technologies.

Hereinafter, electronic devices according to various embodiments will be described with reference to the accompanying drawings. In the disclosure, the term "user" may refer to a person who uses an electronic device or may refer to a device (e.g., an artificial intelligence electronic device) that uses the electronic device.

Prior to describing various embodiments of the disclosure, an integrated intelligence system to which various embodiments of the disclosure may be applied may be described with reference to FIGS. 1A, 1B, 1C, 1D, and 1E.

FIG. 1A is a diagram illustrating an integrated intelligence system, according to an embodiment.

Referring to FIG. 1A, an integrated intelligence system 10 may include a user terminal 100, an intelligence server 200, a personalization information server 300, or a suggestion server 400.

The user terminal 100 may provide a service necessary for a user through an app (or an application program) (e.g., an alarm app, a message app, a picture (gallery) app, or the like) stored in the user terminal 100. For example, the user terminal 100 may execute and operate another app through an intelligence app (or a speech recognition app) stored in the user terminal 100. The other app may be executed through the intelligence app of the user terminal 100 and a user input for performing a task may be received. For example, the user input may be received through a physical button, a touch pad, a voice input, a remote input, or the like.

According to an embodiment, the user terminal 100 may receive a user utterance as a user voice input. The user terminal 100 may receive the user utterance and may generate a command for operating an app based on the user utterance. As such, the user terminal 100 may operate the app, using the command.

The intelligence server 200 may receive a voice input of a user from the user terminal 100 over a communication network and may convert the voice input to text data. In another embodiment, the intelligence server 200 may generate (or select) a path rule based on the text data. The path rule may include information about an action (or an operation) for performing the function of an app or information about a parameter necessary to perform the action. In addition, the path rule may include the order of the action of the app. The user terminal 100 may receive the path rule, may select an app depending on the path rule, and may execute the action included in the path rule in the selected app.

Generally, the term "path rule" of the disclosure may mean, but not limited to, the sequence of states, which allows the electronic device to perform the task requested by the user. In other words, the path rule may include information about the sequence of the states. For example, the task may be a certain action that the intelligence app is capable of providing. The task may include the generation of a schedule, the transmission of a picture to the desired counterpart, or the provision of weather information. The user terminal 100 may perform the task by sequentially having at least one or more states (e.g., an operating state of the user terminal 100).

According to an embodiment, the path rule may be provided or generated by an artificial intelligent (AI) system. The AI system may be a rule-based system, or may be a neural network-based system (e.g., a feedforward neural network (FNN) or a recurrent neural network (RNN)). Alternatively, the AI system may be a combination of the above-described systems or an AI system different from the above-described system. According to an embodiment, the path rule may be selected from a set of predefined path rules or may be generated in real time in response to a user request. For example, the AI system may select at least a path rule of predefined plurality of path rules, or may generate a path rule dynamically (or in real time). Furthermore, the user terminal 100 may use a hybrid system to provide the path rule.

According to an embodiment, the user terminal 100 may execute the action and may display a screen corresponding to a state of the user terminal 100, which executes the action, in a display. According to another embodiment, the user terminal 100 may execute the action and may not display the result obtained by executing the action in the display. For example, the user terminal 100 may execute a plurality of actions and may display only the result of a part of the plurality of actions in the display. For example, the user terminal 100 may display only the result, which is obtained by executing the last action, on the display. According to another embodiment, the user terminal 100 may receive the user input to display the result of executing the action in the display.

The personalization information server 300 may include a database in which user information is stored. For example, the personalization information server 300 may receive the user information (e.g., context information, information about execution of an app, or the like) from the user terminal 100 and may store the user information in the database. The intelligence server 200 may be used to receive the user information from the personalization information server 300 over the communication network and to generate a path rule associated with the user input. According to an embodiment, the user terminal 100 may receive the user information from the personalization information server 300 over the communication network, and may use the user information as information for managing the database.

The suggestion server 400 may include the database storing information about the function in the user terminal 100, the introduction of an application, or the function to be provided. For example, the suggestion server 400 may include a database associated with a function that a user utilizes by receiving the user information of the user terminal 100 from the personalization information server 300. The user terminal 100 may receive information about the function to be provided from the suggestion server 400 over the communication network and may provide the information to the user.

Figure 1B:
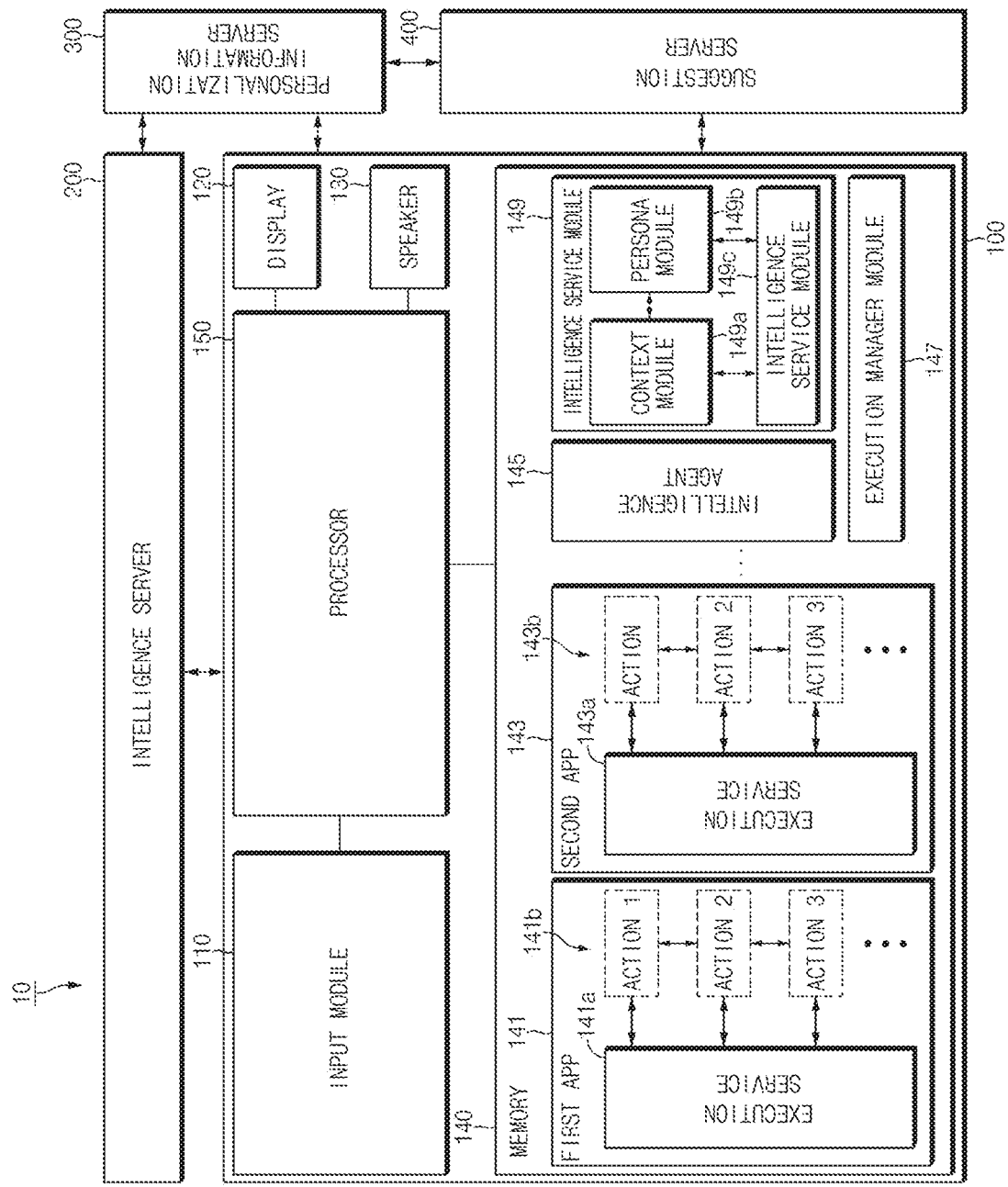
FIG. 1B is a diagram illustrating a user terminal of an integrated intelligence system, according to an embodiment.

Referring to FIG. 1B, the user terminal 100 may include an input module 110, a display 120, a speaker 130, a memory 140, or a processor 150. At least part of components of the user terminal 100 (e.g., the input module 110, the display 120, the speaker 130, the memory 140, or the like) may be electrically or operatively connected to the processor 150. The user terminal 100 may further include housing, and components of the user terminal 100 may be seated in the housing or may be positioned on the housing. The user terminal 100 may further include a communication circuit (or a communication module) positioned in the housing. The user terminal 100 may transmit or receive data (or signal) to or from an external server (e.g., the intelligence server 200) through the communication circuit. In this specification, the user terminal 100 may be referred to as an "electronic device" and may further include components of an electronic device 801 to be described through FIG. 8.

According to an embodiment, the input module 110 may receive a user input from a user. For example, the input module 110 may receive the user input from the connected external device (e.g., a keyboard, a headset, or the like). For another example, the input module 110 may include a touch screen (e.g., a touch screen display) coupled to the display 120. For another example, the input module 110 may include a hardware key (or a physical key) positioned in the user terminal 100 (or the housing of the user terminal 100).

According to an embodiment, the input module 110 may include a microphone that is capable of receiving the utterance of the user as a voice signal. For example, the input module 110 may include a speech input system and may receive the utterance of the user as a voice signal through the speech input system. For example, at least part of the microphone may be exposed through one region (e.g., a first region) of the housing. In an embodiment, the microphone may be controlled to be in an always-on state (e.g., always on) to receive an input (e.g., a voice input) according to a user utterance. In an embodiment, the microphone may be controlled to operate when user manipulation is applied to a hardware key (e.g., 112 of FIG. 1C) provided to one region of the user terminal 100. The user manipulation may include press to the hardware key 112, press and hold to the hardware key 112, or the like.

According to an embodiment, the display 120 may display an image, a video, and/or an execution screen of an application. For example, the display 120 may display a graphic user interface (GUI) of an app. In an embodiment, at least part of the display 120 may be exposed through a region (e.g., a second region) of the housing to receive an input (e.g., a touch input or a drag input) by a user's body (e.g., a finger).

According to an embodiment, the speaker 130 may output a voice signal. For example, the speaker 130 may be generated inside the user terminal 100 or may output a voice signal received from an external device (e.g., the intelligence server 200 of FIG. 1A). In an embodiment, at least part of the speaker 130 may be exposed through one region of the housing (e.g., a third region) in association with the output strength or output efficiency of the audio signal.

According to an embodiment, the memory 140 may store a plurality of apps (or application program) 141 and 143. For example, the plurality of apps 141 and 143 may be a program for performing a function corresponding to the user input. According to an embodiment, the memory 140 may store an intelligence agent 145, an execution manager module 147, or an intelligence service module 149. For example, the intelligence agent 145, the execution manager module 147, and the intelligence service module 149 may be a framework (or application framework) for processing the received user input (e.g., user utterance).

According to an embodiment, the memory 140 may include a database capable of storing information necessary to recognize the user input. For example, the memory 140 may include a log database capable of storing log information. For another example, the memory 140 may include a persona database capable of storing user information.

According to an embodiment, the memory 140 may store the plurality of apps 141 and 143, and the plurality of apps 141 and 143 may be loaded to operate. For example, the plurality of apps 141 and 143 stored in the memory 140 may operate after being loaded by the execution manager module 147. The plurality of apps 141 and 143 may include execution service modules 141a and 143a performing a function. In an embodiment, the plurality of apps 141 and 143 may perform a plurality of actions (e.g., a sequence of states) 141b and 143b through execution service modules 141a and 143a for the purpose of performing a function. In other words, the execution service modules 141a and 143a may be activated by the execution manager module 147 of the processor 150, and then may execute the plurality of actions 141b and 143b.

According to an embodiment, when the actions 141b and 143b of the apps 141 and 143 are executed, an execution state screen according to the execution of the actions 141b and 143b may be displayed in the display 120. For example, the execution state screen may be a screen in a state where the actions 141b and 143b are completed. For another example, the execution state screen may be a screen in a state where the execution of the actions 141b and 143b is in partial landing (e.g., when a parameter necessary for the actions 141b and 143b are not entered).

According to an embodiment, the execution service modules 141a and 143a may execute the actions 141b and 143b depending on a path rule. For example, the execution service modules 141a and 143a may be activated by the execution manager module 147, may receive an execution request from the execution manager module 147 depending on the path rule, and may execute functions of the apps 141 and 143 by performing the actions 141b and 143b depending on the execution request. When the execution of the actions 141b and 143b is completed, the execution service modules 141a and 143a may transmit completion information to the execution manager module 147.

According to an embodiment, when the plurality of actions 141b and 143b are respectively executed in the apps 141 and 143, the plurality of actions 141b and 143b may be executed sequentially. When the execution of one action (e.g., action 1 of the first app 141 or action 1 of the second app 143) is completed, the execution service modules 141a and 143a may open the next action (e.g., action 2 of the first app 141 or action 2 of the second app 143) and may deliver the completion information to the execution manager module 147. Here, it is understood that opening an arbitrary action is to change a state of the arbitrary action to an executable state or to prepare the execution of the action. In other words, when the arbitrary action is not opened, the corresponding action may be not executed. When the completion information is received, the execution manager module 147 may deliver the execution request associated with the next action (e.g., action 2 of the first app 141 or action 2 of the second app 143) to the execution service modules 141a and 143a. According to an embodiment, when the plurality of apps 141 and 143 are executed, the plurality of apps 141 and 143 may be sequentially executed. For example, when receiving the completion information after the execution of the last action (e.g., action 3 of the first app 141) of the first app 141 is completed, the execution manager module 147 may deliver the execution request of the first action (e.g., action 1 of the second app 143) of the second app 143 to the execution service module 143a.

According to an embodiment, when the plurality of actions 141b and 143b are executed in the apps 141 and 143, the result screen according to the execution of each of the executed plurality of actions 141b and 143b may be displayed on the display 120. According to an embodiment, only a part of a plurality of result screens according to the executed plurality of actions 141b and 143b may be displayed on the display 120.

According to an embodiment, the memory 140 may store an intelligence app (e.g., a speech recognition app) operating in conjunction with the intelligence agent 145. The app operating in conjunction with the intelligence agent 145 may receive and process the utterance of the user as a voice signal. According to an embodiment, the app operating in conjunction with the intelligence agent 145 may be operated by a specific input (e.g., an input through a hardware key, an input through a touchscreen, or a specific voice input) input through the input module 110.

According to an embodiment, the intelligence agent 145, the execution manager module 147, or the intelligence service module 149 stored in the memory 140 may be performed by the processor 150. The functions of the intelligence agent 145, the execution manager module 147, or the intelligence service module 149 may be implemented by the processor 150. It is described that the function of each of the intelligence agent 145, the execution manager module 147, and the intelligence service module 149 is the operation of the processor 150. According to an embodiment, the intelligence agent 145, the execution manager module 147, or the intelligence service module 149 stored in the memory 140 may be implemented with hardware as well as software.

According to an embodiment, the processor 150 may control overall operations of the user terminal 100. For example, the processor 150 may control the input module 110 to receive the user input. The processor 150 may control the display 120 to display an image. The processor 150 may control the speaker 130 to output the voice signal. The processor 150 may control the memory 140 to execute a program and to read or store necessary information.

In an embodiment, the processor 150 may execute the intelligence agent 145, the execution manager module 147, or the intelligence service module 149 stored in the memory 140. As such, the processor 150 may implement the function of the intelligence agent 145, the execution manager module 147, or the intelligence service module 149.

According to an embodiment, the processor 150 may execute the intelligence agent 145 to generate an instruction for launching an app based on the voice signal received as the user input. According to an embodiment, the processor 150 may execute the execution manager module 147 to launch the apps 141 and 143 stored in the memory 140 depending on the generated instruction. According to an embodiment, the processor 150 may execute the intelligence service module 149 to manage information of a user and may process a user input, using the information of the user.

The processor 150 may execute the intelligence agent 145 to transmit a user input received through the input module 110 to the intelligence server 200 and may process the user input through the intelligence server 200. According to an embodiment, before transmitting the user input to the intelligence server 200, the processor 150 may execute the intelligence agent 145 to pre-process the user input. According to an embodiment, to pre-process the user input, the intelligence agent 145 may include an adaptive echo canceller (AEC) module, a noise suppression (NS) module, an end-point detection (EPD) module, or an automatic gain control (AGC) module. The AEC may remove an echo included in the user input. The NS module may suppress a background noise included in the user input. The EPD module may detect an end-point of a user voice included in the user input and may search for a part in which the user voice is present, by using the detected end-point. The AGC module may recognize the user input and may adjust the volume of the user input so as to be suitable to process the recognized user input. According to an embodiment, the processor 150 may execute all the pre-processing configurations for performance. However, in another embodiment, the processor 150 may execute a part of the pre-processing configurations to operate at low power.

According to an embodiment, the processor 150 may execute a wakeup recognition module stored in the memory 140 for the purpose of recognizing the call of a user. As such, the processor 150 may recognize the wakeup command of a user through the wakeup recognition module and may execute the intelligence agent 145 for receiving a user input when receiving the wakeup command. The wakeup recognition module may be implemented with a low-power processor (e.g., a processor included in an audio codec). According to various embodiments, when receiving a user input through a hardware key, the processor 150 may execute the intelligence agent 145. When the intelligence agent 145 is executed, an intelligence app (e.g., a speech recognition app) operating in conjunction with the intelligence agent 145 may be executed.

According to an embodiment, the intelligence agent 145 may include a speech recognition module for recognizing the user input. The processor 150 may recognize a user input for executing the operation of the app through the speech recognition module. According to various embodiments, the processor 150 may recognize a restricted user input (e.g., an utterance such as "click" for performing a capture operation when a camera app is being executed) through the speech recognition module. The processor 150 may assist the intelligence server 200 to recognize and rapidly process a user command capable of being processed in the user terminal 100, through the speech recognition module. According to an embodiment, the speech recognition module of the intelligence agent 145 for recognizing a user input may be implemented in an app processor.

According to an embodiment, the speech recognition module (or a wake-up recognition module stored in the memory 140) of the intelligence agent 145 may recognize the user utterance, using an algorithm for recognizing a voice. For example, the algorithm for recognizing the voice may be at least one of a hidden Markov model (HMM) algorithm, an artificial neural network (ANN) algorithm, or a dynamic time warping (DTW) algorithm.

According to an embodiment, the processor 150 may execute the intelligence agent 145 to convert the voice input of the user into text data. For example, the processor 150 may transmit the voice of the user to the intelligence server 200 through the intelligence agent 145 and may receive the text data corresponding to the voice of the user from the intelligence server 200. As such, the processor 150 may display the converted text data in the display 120.

According to an embodiment, the processor 150 may execute the intelligence agent 145 to receive a path rule from the intelligence server 200. According to an embodiment, the processor 150 may transmit the path rule to the execution manager module 147 through the intelligence agent 145.

According to an embodiment, the processor 150 may execute the intelligence agent 145 to transmit the execution result log according to the path rule received from the intelligence server 200 to the intelligence service module 149, and the transmitted execution result log may be accumulated and managed in preference information of the user of a persona module 149*b*.

According to an embodiment, the processor 150 may execute the execution manager module 147, may receive the path rule from the intelligence agent 145, and may execute the apps 141 and 143; and the processor 150 may allow the apps 141 and 143 to execute the actions 141*b* and 143*b* included in the path rule. For example, the processor 150 may transmit command information (e.g., path rule information) for executing the actions 141*b* and 143*b* to the apps 141 and 143, through the execution manager module 147; and the processor 150 may receive completion information of the actions 141*b* and 143*b* from the apps 141 and 143.

According to an embodiment, the processor 150 may execute the execution manager module 147 to transmit the command information (e.g., path rule information) for executing the actions 141*b* and 143*b* of the apps 141 and 143 between the intelligence agent 145 and the apps 141 and 143. The processor 150 may bind the apps 141 and 143 to be executed depending on the path rule through the execution manager module 147 and may transmit the command information (e.g., path rule information) of the actions 141*b* and 143*b* included in the path rule to the apps 141 and 143. For example, the processor 150 may sequentially transmit the actions 141*b* and 143*b* included in the path rule to the apps 141 and 143, through the execution manager module 147 and may sequentially execute the actions 141*b* and 143*b* of the apps 141 and 143 depending on the path rule.

According to an embodiment, the processor 150 may execute the execution manager module 147 to manage execution states of the actions 141*b* and 143*b* of the apps 141 and 143. For example, the processor 150 may receive information about the execution states of the actions 141*b* and 143*b* from the apps 141 and 143, through the execution manager module 147. For example, when the execution states of the actions 141*b* and 143*b* are in partial landing (e.g., when a parameter necessary for the actions 141*b* and 143*b* are not input), the processor 150 may transmit information about the partial landing to the intelligence agent 145, through the execution manager module 147. The processor 150 may make a request for an input of necessary information (e.g., parameter information) to the user by using the received information through the intelligence agent 145. For another example, when the execution state of each of the actions 141*b* and 143*b* is an operating state, the processor 150 may receive an utterance from the user through the intelligence agent 145. The processor 150 may transmit information about the apps 141 and 143 being executed and the execution states of the apps 141 and 143 to the intelligence agent 145, through the execution manager module 147. The processor 150 may transmit the user utterance to the intelligence server 200 through the intelligence agent 145. The processor 150 may receive parameter information of the utterance of the user from the intelligence server 200 through the intelligence agent 145. The processor 150 may transmit the received parameter information to the execution manager module 147 through the intelligence agent 145. The execution manager module 147 may change a parameter of each of the actions 141*b* and 143*b* to a new parameter by using the received parameter information.

According to an embodiment, the processor 150 may execute the execution manager module 147 to transmit parameter information included in the path rule to the apps 141 and 143. When the plurality of apps 141 and 143 are sequentially executed depending on the path rule, the execution manager module 147 may transmit the parameter information included in the path rule from one app to another app.

According to an embodiment, the processor may execute the execution manager module 147 to receive a plurality of path rules. The processor 150 may select a plurality of path rules based on the utterance of the user, through the execution manager module 147. For example, when the user utterance specifies a partial app 141 executing a partial action 141*a* but does not specify the other app 143 executing the remaining action 143*b*, the processor 150 may receive a plurality of different path rules, in which the same app 141 (e.g., a gallery app) executing the partial action 141*a* is executed and the different app 143 (e.g., a message app or a Telegram app) executing the remaining action 143*b* is executed, through the execution manager module 147. For example, the processor 150 may execute the same actions 141*b* and 143*b* (e.g., the same successive actions 141*b* and 143*b*) of the plurality of path rules, through the execution manager module 150. When the processor 150 executes the same action, the processor 150 may display a state screen for selecting the different apps 141 and 143 respectively included in the plurality of path rules in the display 120, through the execution manager module 147.

According to an embodiment, the intelligence service module 149 may include a context module 149*a*, a persona module 149*b*, or a suggestion module 149*c*.

The context module 149*a* may collect current states of the apps 141 and 143 from the apps 141 and 143. For example, the context module 149*a* may receive context information indicating the current states of the apps 141 and 143 to collect the current states of the apps 141 and 143.

The persona module 149*b* may manage personal information of the user utilizing the user terminal 100. For example, the persona module 149*b* may collect the usage information and the execution result of the user terminal 100 to manage personal information of the user.

The suggestion module 149*c* may predict the intent of the user to recommend a command to the user. For example, the suggestion module 149*c* may recommend a command to the user in consideration of the current state (e.g., a time, a place, a situation, or an app) of the user.

Figure 1C:
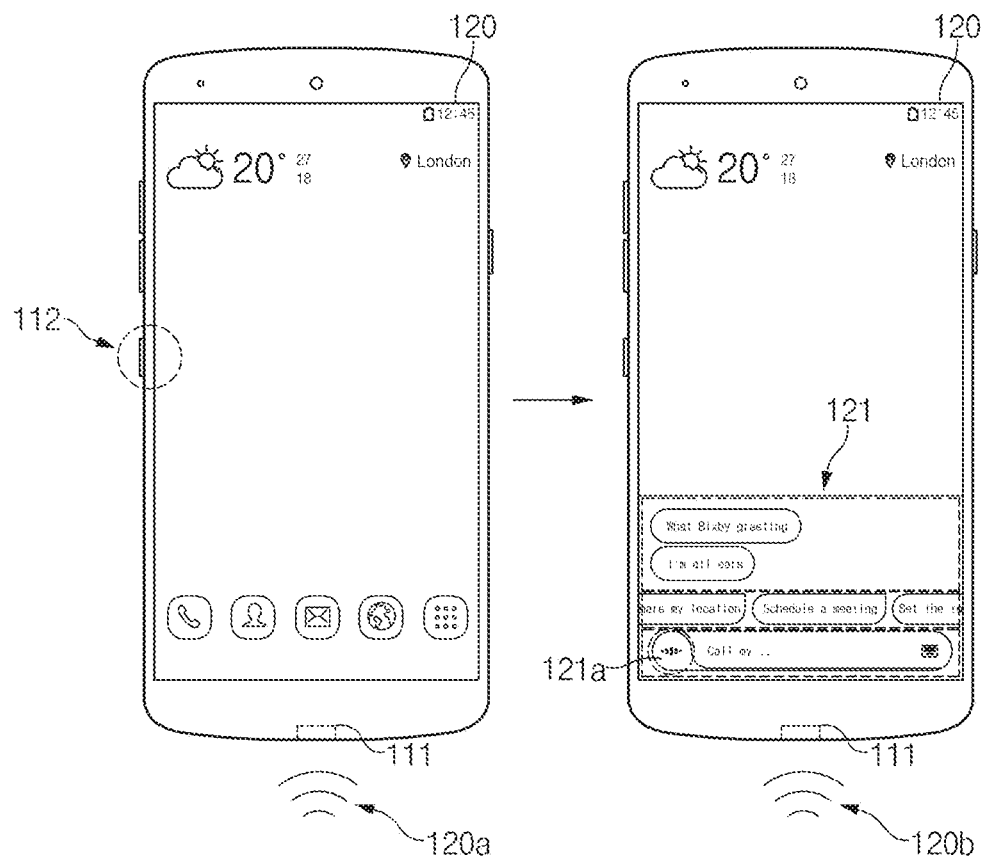
FIG. 1C is a diagram illustrating a form in which an intelligence app of a user terminal is executed, according to an embodiment.

FIG. 1C is a diagram illustrating a form in which an intelligence app of a user terminal is executed, according to an embodiment.

Referring to FIG. 1C, the user terminal 100 may include a hardware button 112 that functions as an interface for receiving an input according to a user utterance. For example, the hardware button 112 may be disposed in an accessible region of the user's body (e.g. a finger) on the housing of the user terminal 100; at least part of the hardware button 112 may be exposed to the outside of the housing. In an embodiment, the user terminal 100 may execute an intelligence app (e.g., a speech recognition app) operating in conjunction with the intelligence agent 145 of FIG. B, in response to the user manipulation applied to the hardware button 112. In an embodiment, a user may continuously press the hardware key 112 (e.g., press or press and hold, or the like) to enter (120*a*) a voice and then may enter (120*a*) the voice.

Alternatively, when receiving a user input through the hardware key 112, the user terminal 100 may display a UI 121 of the intelligence app on the display 120; the user may touch a speech recognition button 121*a* included in the UI 121 to enter (120*b*) a voice in a state where the UI 121 is displayed on the display 120.

Alternatively, the user terminal 100 may execute the installed intelligence app through a microphone 111. For example, when receiving a specified voice (e.g., wake up!, or the like) through the microphone 111, the user terminal 100 may example the intelligence app and may display the UI 121 of the intelligence app on the display 120.

Figure 1D:
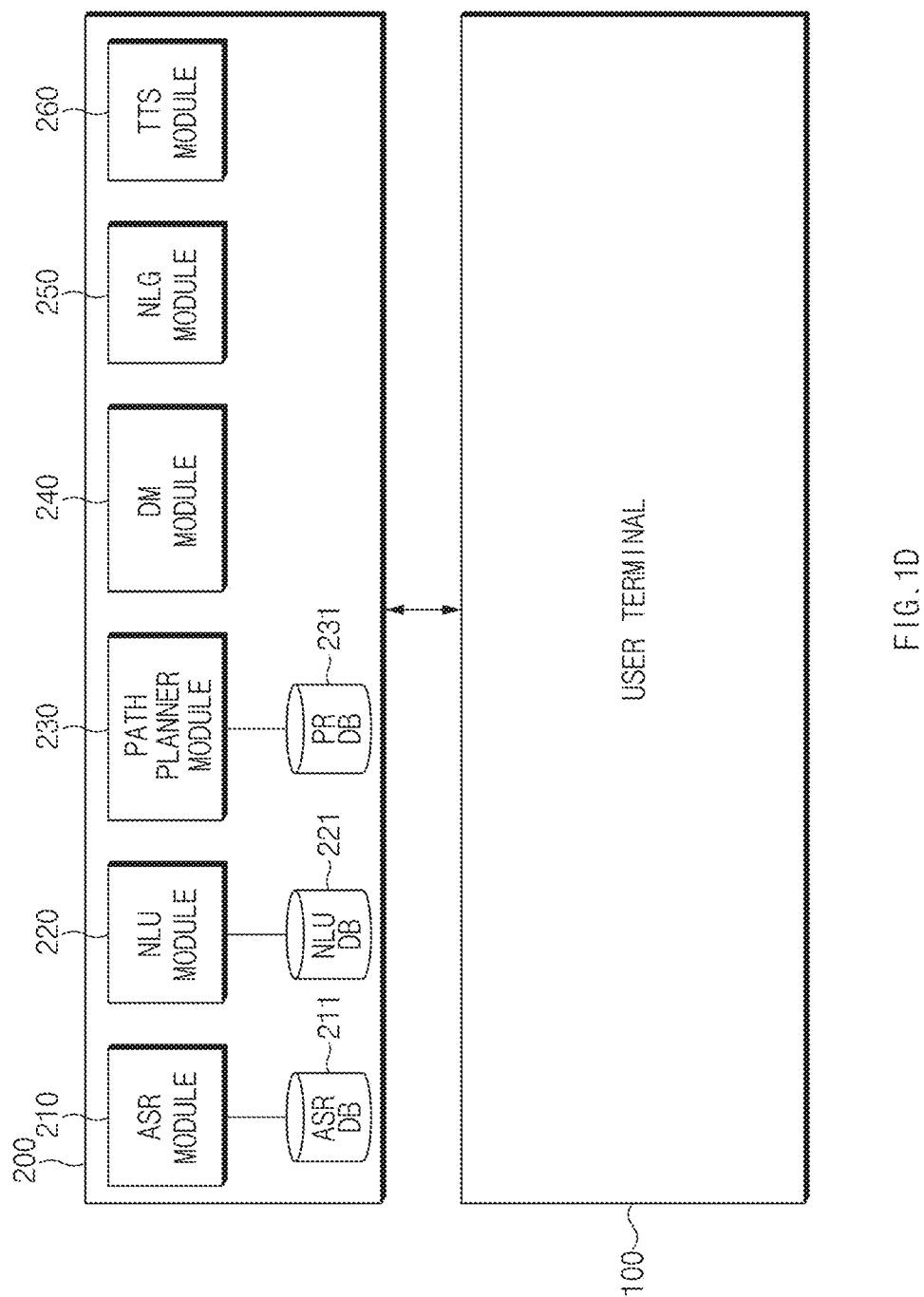
FIG. 1D is a block diagram illustrating an intelligence server of an integrated intelligence system, according to an embodiment.

FIG. 1D is a block diagram illustrating an intelligence server of an integrated intelligence system, according to an embodiment.

Referring to FIG. 1D, the intelligence server 200 may include an automatic speech recognition (ASR) module 210, a natural language understanding (NLU) module 220, a path planner module 230, a dialogue manager (DM) module 240, a natural language generator (NLG) module 250, or a text to speech (TTS) module 260. In various embodiments, at least part of the above-described components of the intelligence server 200 may be included in the user terminal 100 to perform a corresponding function operation.

According to an embodiment, the intelligence server 200 may include a communication circuit, a memory, or a processor. The processor may execute an instruction stored in the memory to drive the ASR module 210, the NLU module 220, the path planner module 230, the DM module 240, the NLG module 250, or the TTS module 260. The intelligence server 200 may transmit or receive data (or signal) to or from an external electronic device (e.g., the user terminal 100) through the communication circuit.

According to an embodiment, the ASR module 210 may convert the user input received from the user terminal 100 to text data. For example, the ASR module 210 may include a speech recognition module. The speech recognition module may include an acoustic model and a language model. For example, the acoustic model may include information associated with phonation, and the language model may include unit phoneme information and information about a combination of unit phoneme information. The speech recognition module may convert a user utterance into text data, using the information associated with phonation and unit phoneme information. For example, the information about the acoustic model and the language model may be stored in an automatic speech recognition database (ASR DB) 211.

According to an embodiment, the NLU module 220 may grasp user intent by performing syntactic analysis or semantic analysis. The syntactic analysis may divide the user input into syntactic units (e.g., words, phrases, morphemes, and the like) and determine which syntactic elements the divided units have. The semantic analysis may be performed by using semantic matching, rule matching, formula matching, or the like. Accordingly, the NLU module 220 may obtain a domain, intent, or a parameter (or a slot) necessary to express the intent, from the user input.

According to an embodiment, the NLU module 220 may determine the intent of the user and parameter by using a matching rule that is divided into a domain, intent, and a parameter (or a slot) necessary to grasp the intent. For example, the one domain (e.g., an alarm) may include a plurality of intent (e.g., alarm settings, alarm cancellation, and the like), and one intent may include a plurality of parameters (e.g., a time, the number of iterations, an alarm sound, and the like). For example, the plurality of rules may include one or more necessary parameters. The matching rule may be stored in a natural language understanding database (NLU DB) 221.

According to an embodiment, the NLU module 220 may grasp the meaning of words extracted from a user input by using linguistic features (e.g., syntactic elements) such as morphemes, phrases, and the like and may match the grasped meaning of the words to the domain and intent to determine user intent. For example, the NLU module 220 may calculate how many words extracted from the user input is included in each of the domain and the intent, for the purpose of determining the user intent. According to an embodiment, the NLU module 220 may determine a parameter of the user input by using the words, which are based for grasping the intent. According to an embodiment, the NLU module 220 may determine the user intent by using the NLU DB 221 storing the linguistic features for grasping the intent of the user input. According to another embodiment, the NLU module 220 may determine the user intent by using a personal language model (PLM). For example, the NLU module 220 may determine the user intent by using the personalized information (e.g., a contact list or a music list). For example, the PLM may be stored in the NLU DB 221. According to an embodiment, the ASR module 210 as well as the NLU module 220 may recognize the voice of the user with reference to the PLM stored in the NLU DB 221.

According to an embodiment, the NLU module 220 may generate a path rule based on the intent of the user input and the parameter. For example, the NLU module 220 may select an app to be executed, based on the intent of the user input and may determine an action to be executed, in the selected app. The NLU module 220 may determine the parameter corresponding to the determined action to generate the path rule. According to an embodiment, the path rule generated by the NLU module 220 may include information about the app to be executed, the action (e.g., at least one or more states) to be executed in the app, and a parameter necessary to execute the action.

According to an embodiment, the NLU module 220 may generate one path rule, or a plurality of path rules based on the intent of the user input and the parameter. For example, the NLU module 220 may receive a path rule set corresponding to the user terminal 100 from the path planner module 230 and may map the intent of the user input and the parameter to the received path rule set to determine the path rule.

According to another embodiment, the NLU module 220 may determine the app to be executed, the action to be executed in the app, and a parameter necessary to execute the action based on the intent of the user input and the parameter for the purpose of generating one path rule or a plurality of path rules. For example, the NLU module 220 may arrange the app to be executed and the action to be executed in the app by using information of the user terminal 100 depending on the intent of the user input in the form of ontology or a graph model for the purpose of generating the path rule. For example, the generated path rule may be stored in a path rule database (PR DB) 231 through the path planner module 230. The generated path rule may be added to a path rule set of the DB 231.

According to an embodiment, the NLU module 220 may select at least one path rule of the generated plurality of path rules. For example, the NLU module 220 may select an optimal path rule of the plurality of path rules. For another example, when only a part of action is specified based on the user utterance, the NLU module 220 may select a plurality of path rules. The NLU module 220 may determine one path rule of the plurality of path rules depending on an additional input of the user.

According to an embodiment, the NLU module 220 may transmit the path rule to the user terminal 100 at a request for the user input. For example, the NLU module 220 may transmit one path rule corresponding to the user input to the user terminal 100. For another example, the NLU module 220 may transmit the plurality of path rules corresponding to the user input to the user terminal 100. For example, when only a part of action is specified based on the user utterance, the plurality of path rules may be generated by the NLU module 220.

According to an embodiment, the path planner module 230 may select at least one path rule of the plurality of path rules.

According to an embodiment, the path planner module 230 may transmit a path rule set including the plurality of path rules to the NLU module 220. The plurality of path rules of the path rule set may be stored in the PR DB 231 connected to the path planner module 230 in the table form. For example, the path planner module 230 may transmit a path rule set corresponding to information (e.g., OS information or app information) of the user terminal 100, which is received from the intelligence agent 145, to the NLU module 220. For example, a table stored in the PR DB 231 may be stored for each domain or for each version of the domain.

According to an embodiment, the path planner module 230 may select one path rule or the plurality of path rules from the path rule set to transmit the selected one path rule or the selected plurality of path rules to the NLU module 220. For example, the path planner module 230 may match the user intent and the parameter to the path rule set corresponding to the user terminal 100 to select one path rule or a plurality of path rules and may transmit the selected one path rule or the selected plurality of path rules to the NLU module 220.

According to an embodiment, the path planner module 230 may generate the one path rule or the plurality of path rules by using the user intent and the parameter. For example, the path planner module 230 may determine the app to be executed and the action to be executed in the app based on the user intent and the parameter for the purpose of generating the one path rule or the plurality of path rules. According to an embodiment, the path planner module 230 may store the generated path rule in the PR DB 231.

According to an embodiment, the path planner module 230 may store the path rule generated by the NLU module 220 in the PR DB 231. The generated path rule may be added to the path rule set stored in the PR DB 231.

According to an embodiment, the table stored in the PR DB 231 may include a plurality of path rules or a plurality of path rule sets. The plurality of path rules or the plurality of path rule sets may reflect the kind, version, type, or characteristic of a device performing each path rule.

According to an embodiment, the DM module 240 may determine whether the user intent grasped by the NLU module 220 is definite. For example, the DM module 240 may determine whether the user intent is clear, based on whether the information of a parameter is sufficient. The DM module 240 may determine whether the parameter grasped by the NLU module 220 is sufficient to perform a task. According to an embodiment, when the user intent is not clear, the DM module 240 may perform a feedback for making a request for necessary information to the user. For example, the DM module 240 may perform a feedback for making a request for information about the parameter for grasping the user intent.

According to an embodiment, the DM module 240 may include a content provider module. When the content provider module executes an action based on the intent and the parameter grasped by the NLU module 220, the content provider module may generate the result obtained by performing a task corresponding to the user input. According to an embodiment, the DM module 240 may transmit the result generated by the content provider module as the response to the user input to the user terminal 100.

According to an embodiment, the NLG module 250 may change specified information to a text form. The information changed to the text form may be in the form of a natural language speech. For example, the specified information may be information about an additional input, information for guiding the completion of an action corresponding to the user input, or information for guiding the additional input of the user (e.g., feedback information about the user input). The information changed to the text form may be displayed in the display 120 after being transmitted to the user terminal 100 or may be changed to a voice form after being transmitted to the TTS module 260.

According to an embodiment, the TTS module 260 may change information of the text form to information of a voice form. The TTS module 260 may receive the information of the text form from the NLG module 250, may change the information of the text form to the information of a voice form, and may transmit the information of the voice form to the user terminal 100. The user terminal 100 may output the information of the voice form to the speaker 130

According to an embodiment, the NLU module 220, the path planner module 230, and the DM module 240 may be implemented with one module. For example, the NLU module 220, the path planner module 230, and the DM module 240 may be implemented with one module, may determine the user intent and the parameter, and may generate a response (e.g., a path rule) corresponding to the determined user intent and parameter. As such, the generated response may be transmitted to the user terminal 100.

Figure 1E:
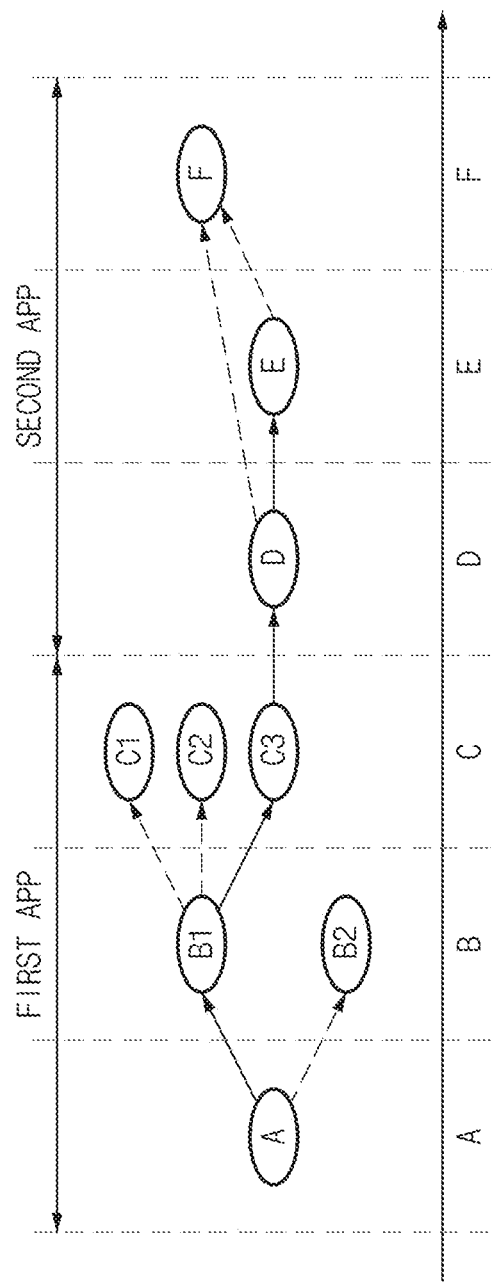
FIG. 1E is a diagram illustrating a path rule generating form of an intelligence server, according to an embodiment.

FIG. 1E is a diagram illustrating a path rule generating form of an intelligence server, according to an embodiment.

Referring to FIG. 1E, according to an embodiment, the NLU module 220 may divide the function of an app into any one action (e.g., state A to state F) and may store the divided unit actions in the PR DB 231. For example, the NLU module 220 may store a path rule set including a plurality of path rules A-B1-C1, A-B1-C2, A-B1-C3-D-F, and A-B1-C3-D-E-F, which are divided into actions (e.g., states), in the PR DB 231.

According to an embodiment, the PR DB 231 of the path planner module 230 may store the path rule set for performing the function of an app. The path rule set may include a plurality of path rules, each of which includes a plurality of actions (e.g., a sequence of states). The action executed depending on a parameter input to each of the plurality of actions may be sequentially arranged in each of the plurality of path rules. According to an embodiment, the plurality of path rules implemented in a form of ontology or a graph model may be stored in the PR DB 231.

According to an embodiment, the NLU module 220 may select an optimal path rule A-B1-C3-D-F of the plurality of path rules A-B1-C1, A-B1-C2, A-B1-C3-D-F, and A-B1-C3-D-E-F corresponding to the intent of a user input and the parameter.

According to an embodiment, when there is no path rule completely matched to the user input, the NLU module 220 may deliver a plurality of rules to the user terminal 100. For example, the NLU module 220 may select a path rule (e.g., A-B1) partly corresponding to the user input. The NLU module 220 may select one or more path rules (e.g., A-B1-C1, A-B1-C2, A-B1-C3-D-F, and A-B1-C3-D-E-F) including the path rule (e.g., A-B1) partly corresponding to the user input and may deliver the one or more path rules to the user terminal 100.

According to an embodiment, the NLU module 220 may select one of a plurality of path rules based on an input added by the user terminal 100 and may deliver the selected one path rule to the user terminal 100. For example, the NLU module 220 may select one path rule (e.g., A-B1-C3-D-F) of the plurality of path rules (e.g., A-B1-C1, A-B1-C2, A-B1-C3-D-F, and A-B1-C3-D-E-F) depending on the user input (e.g., an input for selecting C3) additionally entered by the user terminal 100 for the purpose of transmitting the selected one path rule to the user terminal 100.

According to another embodiment, the NLU module 220 may determine the intent of a user and the parameter corresponding to the user input (e.g., an input for selecting C3) additionally entered by the user terminal 100 for the purpose of transmitting the user intent or the parameter to the user terminal 100. The user terminal 100 may select one path rule (e.g., A-B1-C3-D-F) of the plurality of path rules (e.g., A-B1-C1, A-B1-C2, A-B1-C3-D-F, and A-B1-C3-D-E-F) based on the transmitted intent or the transmitted parameter.

As such, the user terminal 100 may complete the actions of the apps 141 and 143 based on the selected one path rule.

According to an embodiment, when a user input in which information is insufficient is received by the intelligence server 200, the NLU module 220 may generate a path rule partly corresponding to the received user input. For example, the NLU module 220 may transmit the partly corresponding path rule to the intelligence agent 145. The processor 150 may execute the intelligence agent 145 to receive the path rule and may deliver the partly corresponding path rule to the execution manager module 147. The processor 150 may execute the first app 141 depending on the path rule through the execution manager module 147. The processor 150 may transmit information about an insufficient parameter to the intelligence agent 145 through the execution manager module 147 while executing the first app 141. The processor 150 may make a request for an additional input to a user, using the information about the insufficient parameter, through the intelligence agent 145. When the additional input is received by the user through the intelligence agent 145, the processor 150 may transmit and process a user input to the intelligence server 200. The NLU module 220 may generate a path rule to be added, based on the intent of the user input additionally entered and parameter information and may transmit the path rule to be added, to the intelligence agent 145. The processor 150 may transmit the path rule to the execution manager module 147 through the intelligence agent 145 to execute the second app 143.

According to an embodiment, when a user input, in which a part of information is missing, is received by the intelligence server 200, the NLU module 220 may transmit a user information request to the personalization information server 300. The personalization information server 300 may transmit information of a user entering the user input stored in a persona database to the NLU module 220. The NLU module 220 may select a path rule corresponding to the user input in which a part of an action is partly missing, by using the user information. As such, even though the user input in which a portion of information is missing is received by the intelligence server 200, the NLU module 220 may make a request for the missing information to receive an additional input or may determine a path rule corresponding to the user input by using user information.

According to an embodiment, Table 1 attached below may indicate an exemplary form of a path rule associated with a task that a user requests.

TABLE 1

| Path rule ID | State | Parameter |
| --- | --- | --- |
| Gallery_101 | PictureView(25) | NULL |
|  | SearchView(26) | NULL |
|  | SearchViewResult(27) | Location, time |
|  | SearchEmptySelectedView(28) | NULL |
|  | SearchSelectedView(29) | ContentType, selectall |
|  | CrossShare(30) | anaphora |

Referring to Table 1, a path rule that is generated or selected by an intelligence server (the intelligence server 200 of FIG. 1D) depending on user speech (e.g., "please share a picture") may include at least one state 25, 26, 27, 28, 29 or 30. For example, the at least one state (e.g., one operating state of the user terminal 100) may correspond to at least one of picture application execution PicturesView 25, picture search function execution SearchView 26, search result display screen output SearchViewResult 27, search result display screen output, in which a picture is non-selected, SearchEmptySelectedView 28, search result display screen output, in which at least one picture is selected, SearchSelectedView 29, or share application selection screen output CrossShare 30.

In an embodiment, parameter information of the path rule may correspond to at least one state. For example, at least one picture is included in the selected state of SearchSelectedView 29.

The task (e.g., "share a picture!") that the user requests may be performed depending on the execution result of the path rule including the sequence of the states 25, 26, 27, 28, and 29.

Figure 2:
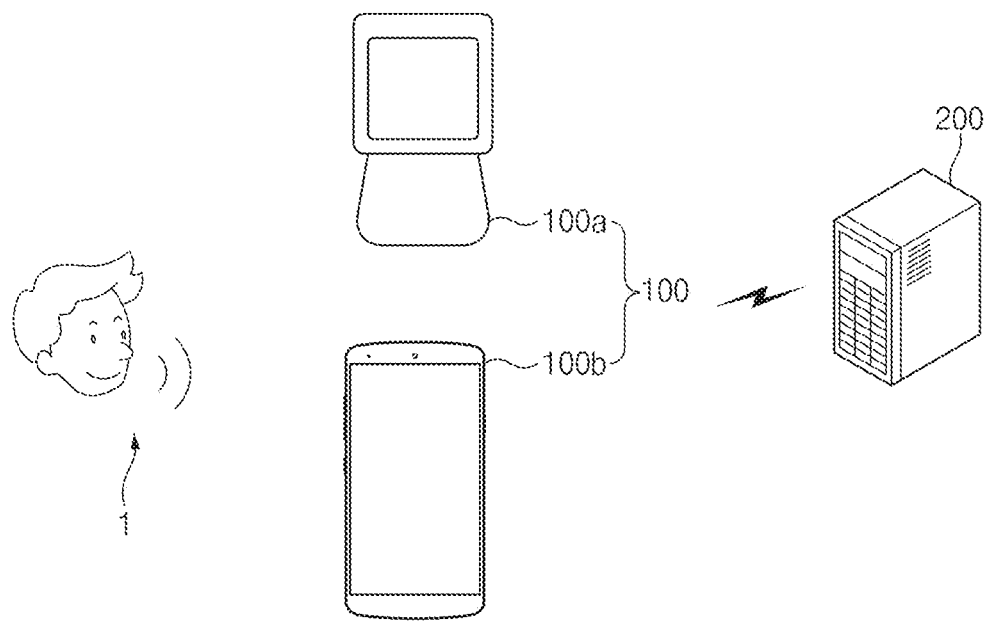
FIG. 2 is a diagram illustrating an example of an operation of a user terminal, according to an embodiment.

FIG. 2 is a diagram illustrating an example of an operation of a user terminal, according to an embodiment.

As described above through FIG. 1A to 1E, components of the integrated intelligence system 10 of FIG. 1A may perform a series of processes for providing a speech recognition service. For example, the user terminal 100 may receive a user utterance including a specific command or intent and may transmit voice data according to the user utterance to the intelligence server 200. The intelligence server 200 may derive the intent of the user utterance according to the voice data based on a matching rule composed of a domain, intent, and parameter, in response to receiving the voice data. The intelligence server 200 may perform a task based on the derived intent of the user utterance or may select an application program on the user terminal 100 for providing content; the intelligence server 200 may generate or select a path rule for states (or operations) of the user terminal 100 associated with performing the task or providing content and may provide the path rule to the user terminal 100.

Referring to FIG. 2, the user terminal 100 (e.g., an audio output device 100a or a mobile device 100b supporting the operation of a speech recognition service based on the integrated intelligence system 10) may predict a user utterance (hereinafter referred to as a "command utterance") including the specific command or intent, in performing a series of processes as described above. In this regard, at the time before receiving the command utterance, the user terminal 100 may analyze a user utterance 1 (e.g., a user utterance that does not imply a command or intent, hereinafter referred to as a "daily utterance") having characteristics different from those of the command utterance received through the mounted microphone 111 of FIG. 1C. The user terminal 100 may analyze at least one information resource (e.g., words, phrases, or morphemes) included in the daily utterance 1; when the information resource satisfies the specified condition, the user terminal 100 may record the daily utterance 1 as a starting time when the satisfaction of the condition is determined.

In an embodiment, the user terminal 100 may transmit the recorded data to the intelligence server 200 and may receive information corresponding to (or mapped onto at least part of the daily utterance 1) at least part of the daily utterance 1 from the intelligence server 200. For example, the information may include response information of the user terminal 100 about the command utterance predicted to occur at the time after the speech recognition service is activated on the user terminal 100. Accordingly, it may be understood that the reception of the information of the user terminal 100 is an operation of predicting a command utterance having the possibility of being uttered from a user by the interaction between the user terminal 100 and the intelligence server 200 and pre-preparing the response of the user terminal 100 for the predicted command utterance.

In an embodiment, when the predicted command utterance is actually generated by the user after activation of the speech recognition service, the user terminal 100 may recognize the generated command utterance and may output pre-prepared response information in the form of a user interface including a voice, a text, or content. Alternatively, when the predicted command utterance does not occur within a specified time range after activation of the speech recognition service, the user terminal 100 may delete information received from the intelligence server 200 on the user terminal 100. Various embodiments associated with the response preparation of the user terminal 100 according to command utterance prediction will be described through the referenced drawings.

Figure 3:
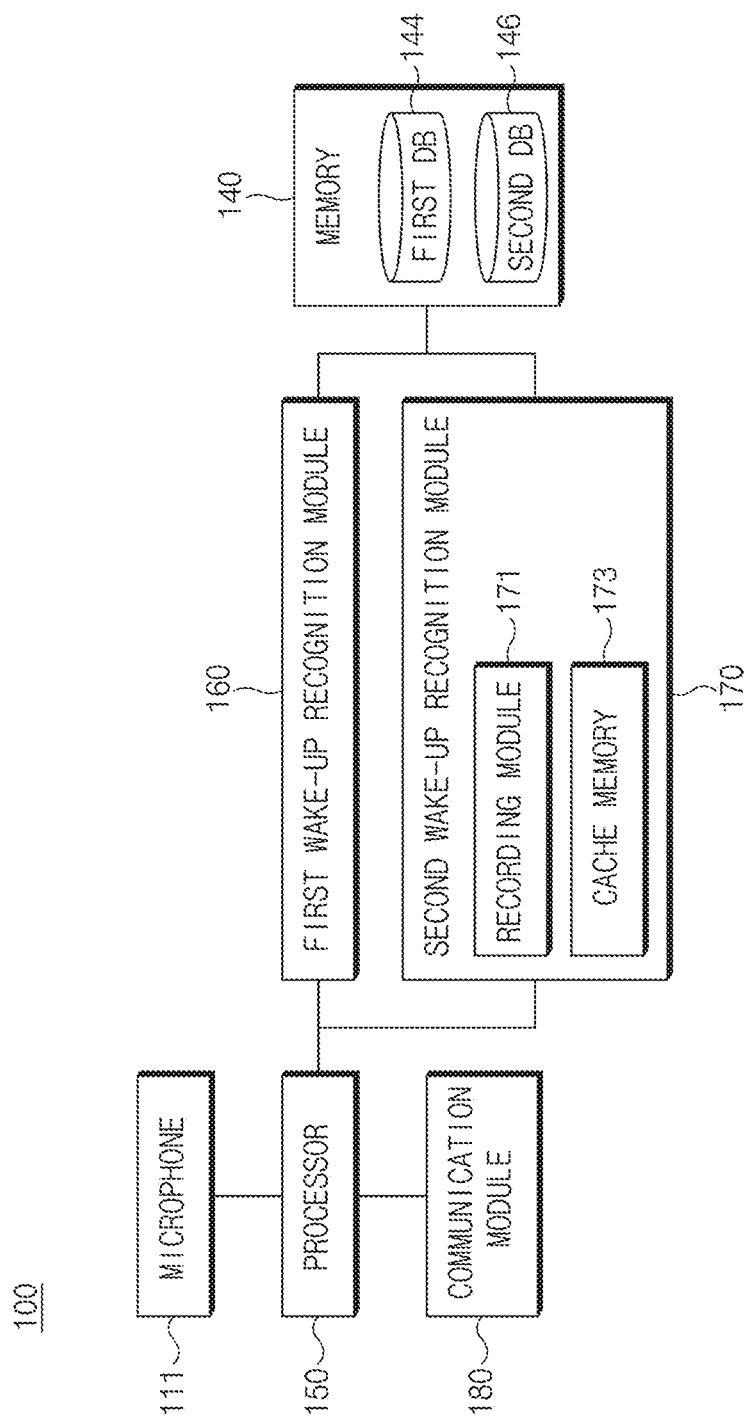
FIG. 3 is a diagram illustrating at least one wake-up recognition module included in a user terminal according to an embodiment.

FIG. 3 is a diagram illustrating at least one wake-up recognition module included in a user terminal according to an embodiment. At least one wake-up recognition module 160 or 170 may be stored in the memory 140 or another memory.

Referring to FIG. 3, the user terminal 100 may include an at least one wake-up recognition module supporting the activation of at least one mounted function. For example, the user terminal 100 may include at least one of the first wake-up recognition module 160 for activating a speech recognition service function described above or the second wake-up recognition module 170 for activating the recording function for an operating environment. When receiving an utterance through the microphone 111 equipped with the user terminal 100, the first wake-up recognition module 160 or the second wake-up recognition module 170 is executed under the control of the processor 150 to analyze the received utterance and may activate the related function (e.g., a speech recognition service function or a recording function) depending on the analysis result.

In an embodiment, the first wake-up recognition module 160 may receive the utterance (or voice data according to an utterance) received from the processor 150 through the microphone 111 and may recognize the utterance to analyze information resources (e.g., words, phrases, or morphemes) included in the utterance. For example, the first wake-up recognition module 160 may compare information resources included on the utterance with information resources included in a first database 144 of the memory 140. In this regard, the first database 144 may include, for example, first trigger information (e.g., "Hi, Galaxy" or "Hi, Bixby") in the form of words, phrases, or morphemes that triggers the activation of the speech recognition service function. When the information resources on the utterance matches or corresponds to the first trigger information, the first wake-up recognition module 160 may activate the speech recognition service function on the user terminal 100. For example, the first wake-up recognition module 160 may execute an intelligence agent (145 in FIG. 1B) as the part of activating the speech recognition service function; in this case, an intelligence app linked with the intelligence agent 145 may also be executed.

In an embodiment, similarly to the first wake-up recognition module 160, the second wake-up recognition module 170 may recognize an utterance (or voice data according to utterance) transmitted from the processor 150 and may compare information resources (e.g., words, phrases, morphemes, or the like) included on the utterance with information resources included in the second database 146 of the memory 140.

TABLE 2

| Trigger category | Second trigger information |
|---|---|
| Event planning | Date, place, weather, reservation, schedule . . . |
| Ask oneself | What was it, what is it? . . . |
| Decision making | Where do you want to go?, What do you want to do? What do you want to eat? . . . |
| Emotional expression | Bored, hungry, sleepy . . . |
| Content | Titanic, the ghost of the opera . . . |
| Celebrity | Michael Jordan, Obama . . . |
| . . . | . . . |

Table 2 may show an exemplary form of the second trigger information corresponding to the information resource of the second database 146. Referring to Table 2, the second database 146 may include the second trigger information in the form of words, phrases or morphemes that triggers the activation of the recording function installed in the user terminal 100. In an embodiment, the second trigger information may be set from the user and may be set as information resources in the form of words, phrases, or morphemes that may be included on the utterance such as the monologue of a user or the conversation with another person. Alternatively, the second trigger information may be set by the learning of the user terminal 100 for at least one utterance recorded through the operation of the recording function. For example, the user terminal 100 may determine information resources in the form of words, phrases, or morphemes, which are included above a specified threshold amount in the recorded utterance history, and may set the determined information resources as the second trigger information. In other words, the second trigger information may be set as information resources that are likely to be included in a user utterance (e.g., the daily utterance mentioned above) having different characteristics from those of a user utterance (e.g., the command utterance mentioned above) including a command or intent for performing a specific task through the user terminal 100.

In an embodiment, when the information resource on the utterance received from the processor 150 matches or corresponds to the second trigger information included in the second database 146, the second wake-up recognition module 170 may activate a recording function on the user terminal 100. For example, the second wake-up recognition module 170 may record at least part of the utterance received through the microphone 111 by controlling an internal recording module 171 at the time of the activation of the recording function and may store the recorded data in an internal cache memory 173. At this time, the recorded utterance may include at least one of the utterance of the actual user of the user terminal 100 or the utterance of another person specified by the actual user. The second wake-up recognition module 170 may stop (or deactivate the recording function) the recording at a specific time based on pre-processing (e.g., end-point detection) of the processor 150 for the recorded utterance and may transmit the recorded data to the intelligence server 200 in FIG. 2.

Figure 4:
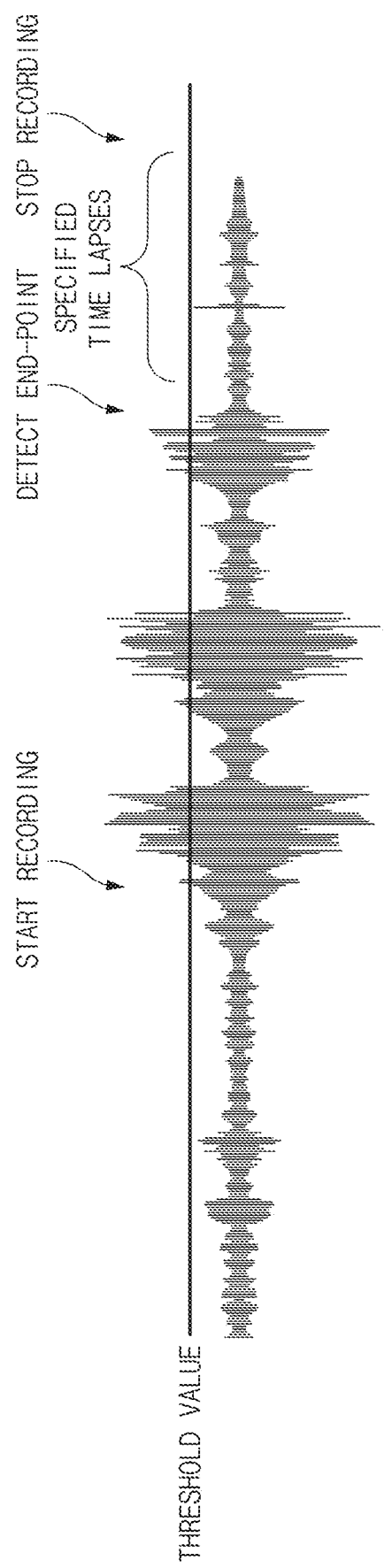
FIG. 4 is a view illustrating a recording form of a user terminal according to an embodiment.
Figure 5:
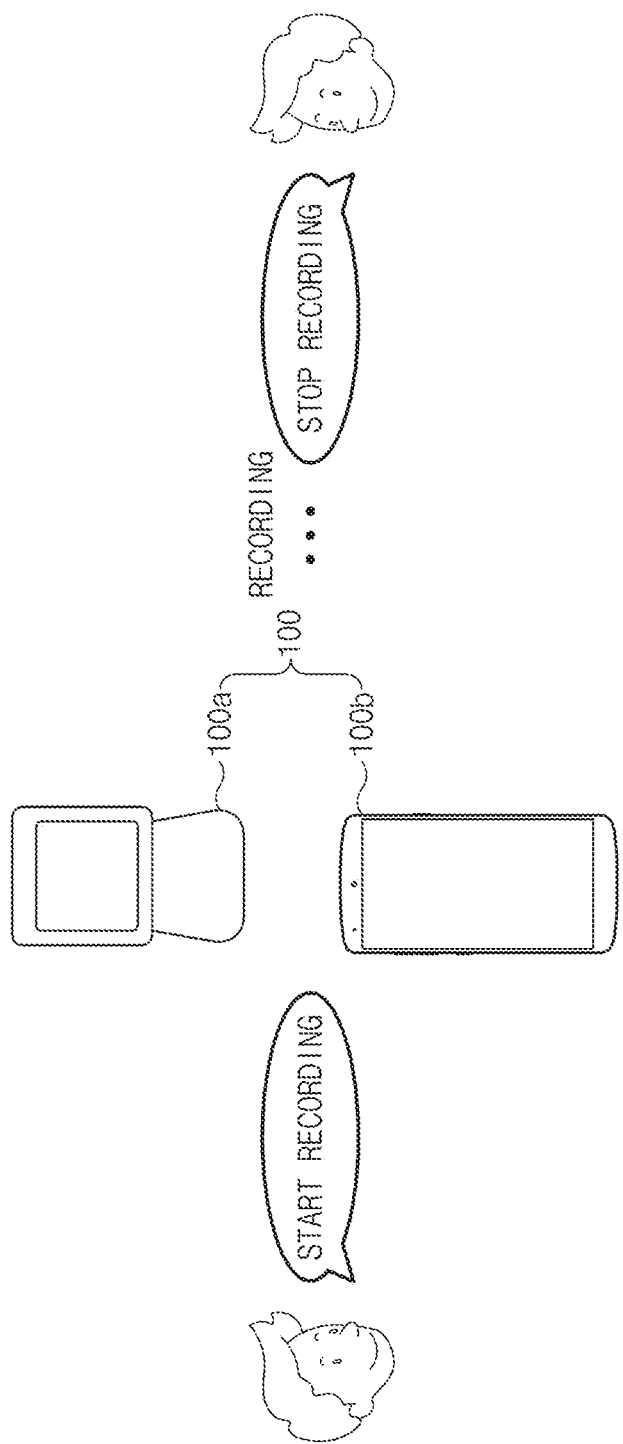
FIG. 5 is a view illustrating another recording form of a user terminal according to an embodiment.

FIGS. 4 and 5 are views illustrating various recording forms of a user terminal according to an embodiment.

According to an embodiment, in addition to activating the recording function based on the second wake-up recognition module 170 in FIG. 3 described above, the processor 150 in FIG. 1B of the user terminal 100 in FIG. 2 may activate the recording function in response to various events.

Referring to FIG. 4, the processor 150 may receive at least one utterance occurring on the operating environment of the user terminal 100, based on the microphone 111 in FIG. 3 controlled by the always running state (e.g. always on). In an embodiment, the processor 150 may, in real time or periodically, identify the volume level (or the size of voice data according to the utterance) with respect to the received utterance and may compare the identified volume level with the specified threshold value. When the comparison result indicates that the volume level is not less than the specified threshold value, the processor 150 may control the recording module 171 in FIG. 3 in the second wake-up recognition module 170 such that the recording of the utterance being received by the user terminal 100 is performed. In this operation, the processor 150 may detect the end-point of the recorded utterance by pre-processing the recorded utterance; when an utterance is not received while the specified time has elapsed from the end-point detection time, the processor 150 may stop the recording.

Referring to FIG. 5, the processor 150 may activate a recording function in response to a user command. In this regard, a recording command utterance (e.g., "start recording", or the like) or a recording command text (e.g., recording start, or the like) for triggering the activation of the recording function may be set on the user terminal 100. When receiving the recording command utterance or recording command text, the processor 150 may activate a recording function to record at least one utterance occurring on the operating environment of the user terminal 100. Furthermore, the processor 150 may stop the recording in progress, in response to receiving the recording interruption utterance (e.g., "stop recording", or the like) or the recording interruption text (e.g., recording interruption, or the like) set on the user terminal 100.

Figure 6:
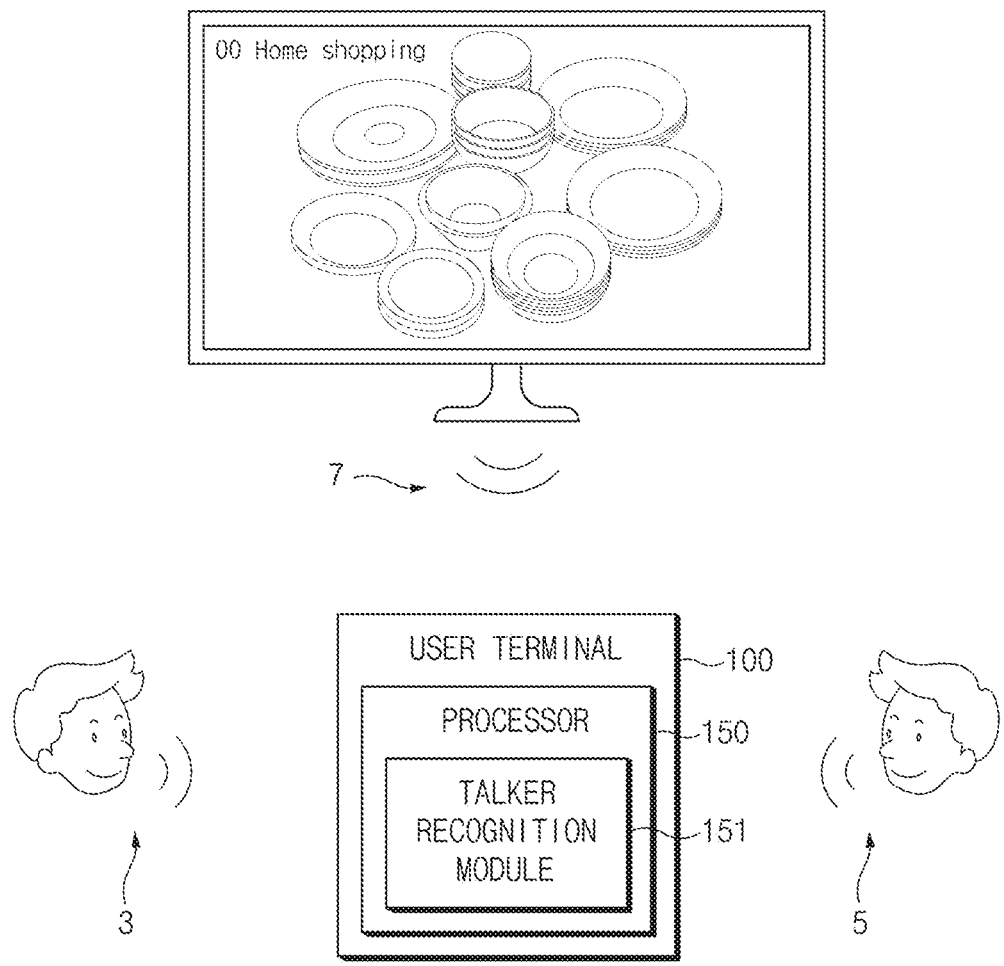
FIG. 6 is a view illustrating a recording environment of a user terminal according to an embodiment.

FIG. 6 is a view illustrating a recording environment of a user terminal according to an embodiment.

Referring to FIG. 6, in recording the utterance (e.g., the daily utterance described above) according to the activation of the above-mentioned recording function, the user terminal 100 may maintain the recording based on the talker recognition of the recorded utterance or may stop recording (or switch the activated recording function to be in an inactive state). In this regard, the processor 150 of the user terminal 100 may include a talker recognition module 151 for recognizing the actual user of the user terminal 100 and/or at least one talker (e.g., the actual user's family, the actual user's friend, or the like) specified by the actual user. In an embodiment, the talker recognition module 151 may include a talker recognition model corresponding to each of an actual user and/or the specified at least one talker. According to various embodiments, the talker recognition model may be generated by using a feature vector extracted from a reference utterance initially uttered by the actual user and/or the specified at least one talker.

In an embodiment, the processor 150 may perform talker recognition on the recorded utterance with reference to at least one talker recognition model corresponding to the actual user and/or the specified at least one talker. When the result of talker recognition indicates that the recorded utterance corresponds to one of the at least one talker recognition model, the processor 150 may determine that the recorded utterance is an utterance 3 by the specified talker and may maintain the recording. Alternatively, when the recorded utterance does not correspond to any of the at least one talker recognition model, the processor 150 may determine that the recorded utterance is an utterance 5 by other people other than the specified talker and may stop the recording. In various embodiments, when the user terminal 100 receives a sound 7 output from an audio medium (e.g., TV, radios, monitors, or the like), the processor 150 may stop the recording in progress. For example, the processor 150 may analyze the recorded data, in real time or periodically; when the data includes sound data having different characteristics from those of the human voice, the processor 150 may stop the recording in progress. In other words, even though the processor 150 receives a voice or sound including the second trigger information described above, when it is determined that the voice or sound is not a voice uttered by the specified talker or it is determined that the voice or sound is the sound output from the sound medium, the processor 150 may not activate the recording function or may switch the activated recording function to be in an inactive state.

Figure 7A:
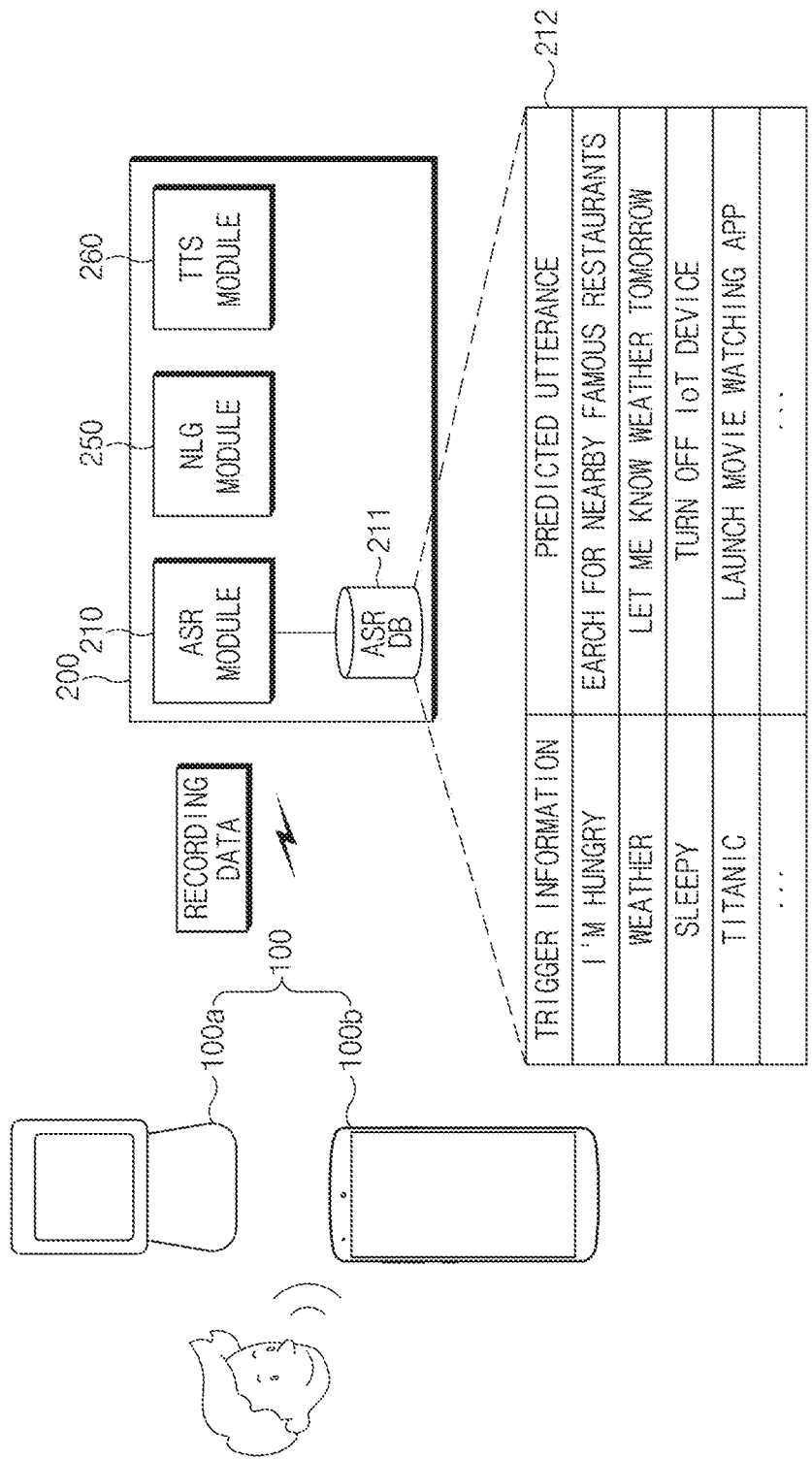
FIG. 7A is a view illustrating a recording data processing form of an intelligence server according to the first embodiment.
Figure 7B:
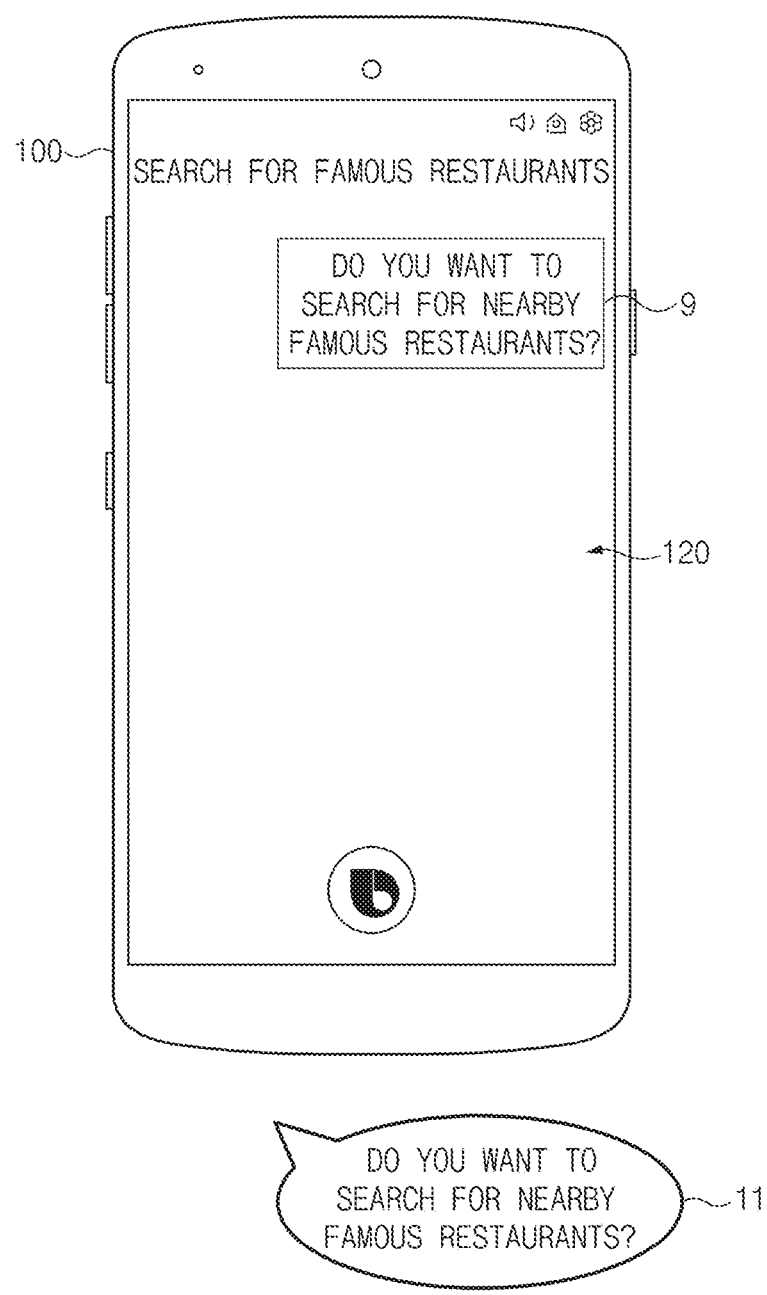
FIG. 7B is a view illustrating a response form of a user terminal according to the first embodiment.

FIG. 7A is a view illustrating a recording data processing form of an intelligence server according to the first embodiment. FIG. 7B is a view illustrating a response form of a user terminal according to the first embodiment.

Referring to FIG. 7A, at the time when the active state of the recording function is transitioned to the inactive state or at the time when the specified time elapses from the transition, the processor 150 in FIG. 1B of the user terminal 100 may access a communication network supporting access to the intelligence server 200 and may transmit the recorded data to the intelligence server 200. The processor of the intelligence server 200 may convert recording data in the form of voice data into text data based on the ASR module 210 in response to receiving the recording data and may compare the converted text data with a table 212 built in the ASR DB 211. In this regard, the table 212 may include at least one trigger information, which is the same as or similar to the second trigger information included in the second database 146 in FIG. 3 of the user terminal 100 described above, and at least one predicted utterance mapped to each at least one trigger information (second trigger information). According to various embodiments, the trigger information included in the table 212 may be extended and set from the second trigger information of the user terminal 100. For example, the processor of the intelligence server 200 may extend trigger information by changing or adding the part of speech, such as a postposition, an adverb, or the like, to the second trigger information (e.g., I'm hungry) or may change the order of the extended trigger information, thereby setting various aspects of trigger information (e.g., I'm hungry, hunger, I'm really hungry, hungry, or the like) based on the second trigger information. Moreover, the predicted utterance may be set with reference to the history of the user utterance received by the intelligence server 200 from the user terminal 100. For example, the predicted utterance may be set as a user utterance received at a high frequency among a group of user utterance candidates in which the trigger information has been derived as corresponding to at least one of a domain, intent, or parameter. Alternatively, the predicted utterance may be set from the user of the user terminal 100. For example, the intelligence server 200 may make a request for settings of the predicted utterance along with the transmission of the trigger information to the user terminal 100; and after setting a usual utterance associated with the trigger information as the predicted utterance with reference to the trigger information, the user may provide the intelligence server 200 with the predicted utterance.

In an embodiment, in an operation of comparing the text data obtained by converting the recording data with the trigger information on the table 212, the processor of the intelligence server 200 may determine the similarity between the text data and the trigger information. For example, the processor of the intelligence server 200 may calculate a score depending on the extent to which the text data and trigger information include words, phrases, or morphemes the same as each other; when the calculated score is not less than the specified threshold value, the processor of the intelligence server 200 may determine that the text data and the trigger information correspond to each other. In this case, the processor of the intelligence server 200 may identify the predicted utterance mapped onto the trigger information corresponding to the text data and may deliver the predicted utterance to the user terminal 100 and the NLG module 250. In an embodiment, the NLG module 250 may generate feedback information in text form corresponding to the predicted utterance, based on the received predicted utterance. Alternatively, the NLG module 250 may deliver the generated feedback information to the TTS module 260 and may request the TTS module 260 to convert the feedback information in text form to a voice form to transmit the converted feedback information to the user terminal 100.

For example for the above descriptions, the intelligence server 200 may receive recording data for a user utterance (e.g., "I'm really hungry") including second trigger information such as "I'm hungry" from the user terminal 100. In this case, the intelligence server 200 may convert the recording data into a text form (e.g., I'm really hungry) to determine the similarity with trigger information included in the table 212. When it is determined that the text data (e.g., I'm really hungry) corresponds to specific trigger information (e.g., I'm hungry) on the table 212, the intelligence server 200 may identify the predicted utterance (e.g., search for nearby famous restaurants) mapped onto the specific trigger information (e.g., I'm hungry). The intelligence server 200 may generate feedback information (e.g., "Do you want to search for nearby famous restaurants?") in the form of text or voice corresponding to the identified predicted utterance and may transmit the feedback information to the user terminal 100.

Referring to FIG. 7B, the user terminal 100 may store the feedback information (e.g., "Do you want to search for nearby famous restaurants?") and the predicted utterance in a form of texts or voices received from the intelligence server 200, in the cache memory 173 in FIG. 3 inside the second wake-up recognition module 170 in FIG. 3. In an embodiment, from the time after the speech recognition service function is activated on the user terminal (100), the processor 150 of the user terminal 100 may determine whether to output the feedback information, by analyzing the utterance (e.g., the command utterance mentioned above) received by the user terminal 100. In this regard, the processor 150 may recognize the received utterance based on the ASR module included in the intelligence agent 145 in FIG. 1B executed in response to the activation of the speech recognition service function and may compare the recognized utterance with the predicted utterance received from the ASR module 210 of the intelligence server 200. When the recognized utterance and the predicted utterance include the same words, phrases or morphemes to correspond to each other to be more than a specified ratio or to have the same grammatical meaning, the processor 150 may output (9) feedback information stored in the cache memory 173 in a form of texts on the display 120 or may output (11) in the form of a voice through a speaker 130 in FIG. 1B. On the other hand, from the time after the speech recognition service function is activated to the time when the specified time has elapsed, when the user terminal 100 does not receive an utterance or the received at least one utterance does not correspond to the predicted utterance, the processor 150 may delete the predicted utterance and the feedback information, which are stored in the cache memory 173.

According to the above-described embodiment, the user terminal 100 may prepare at least part of a response corresponding to a user utterance in advance depending on predicting a user utterance and may provide the prepared response when the predicted user utterance occurs, thereby reducing a user's response waiting time.

Figure 8A:
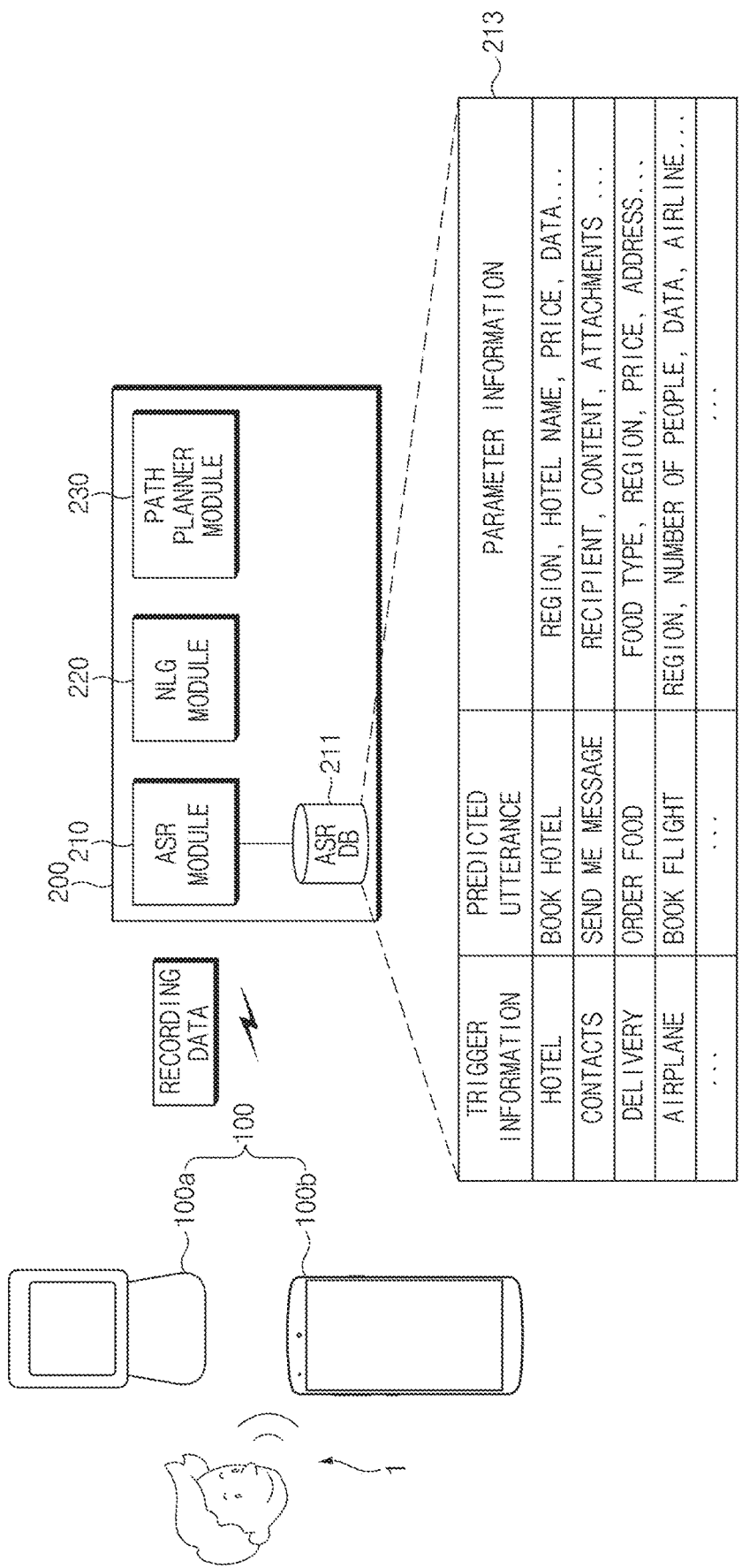
FIG. 8A is a view illustrating a recording data processing form of an intelligence server according to the second embodiment.
Figure 8B:
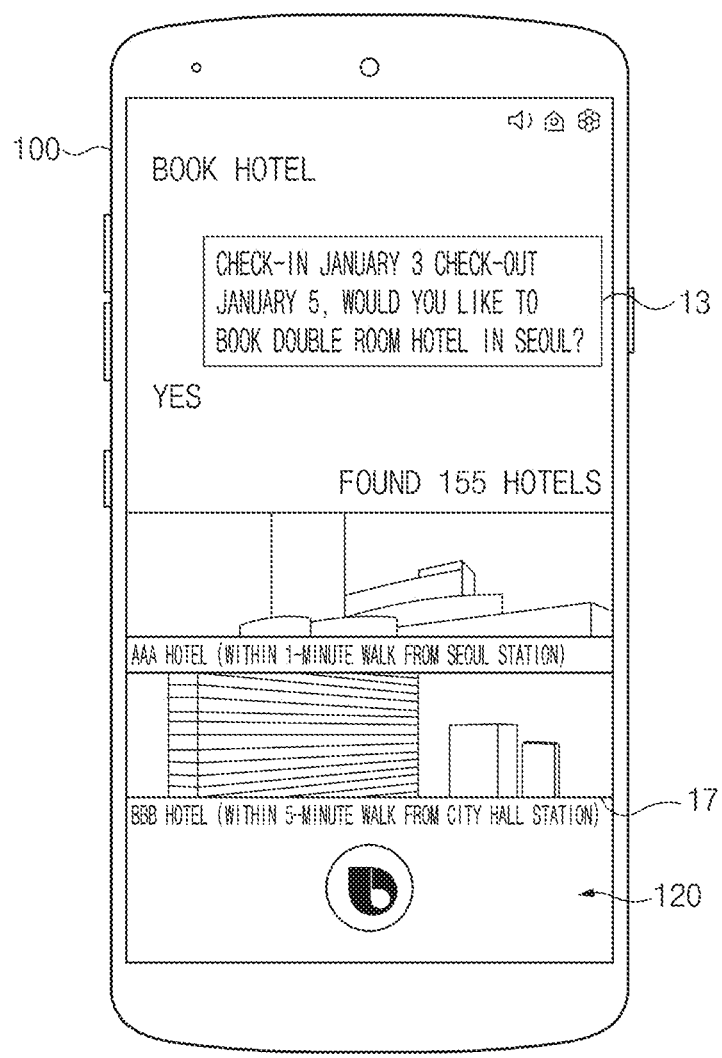
FIG. 8B is a view illustrating a response form of a user terminal according to the second embodiment.
Figure 8C:
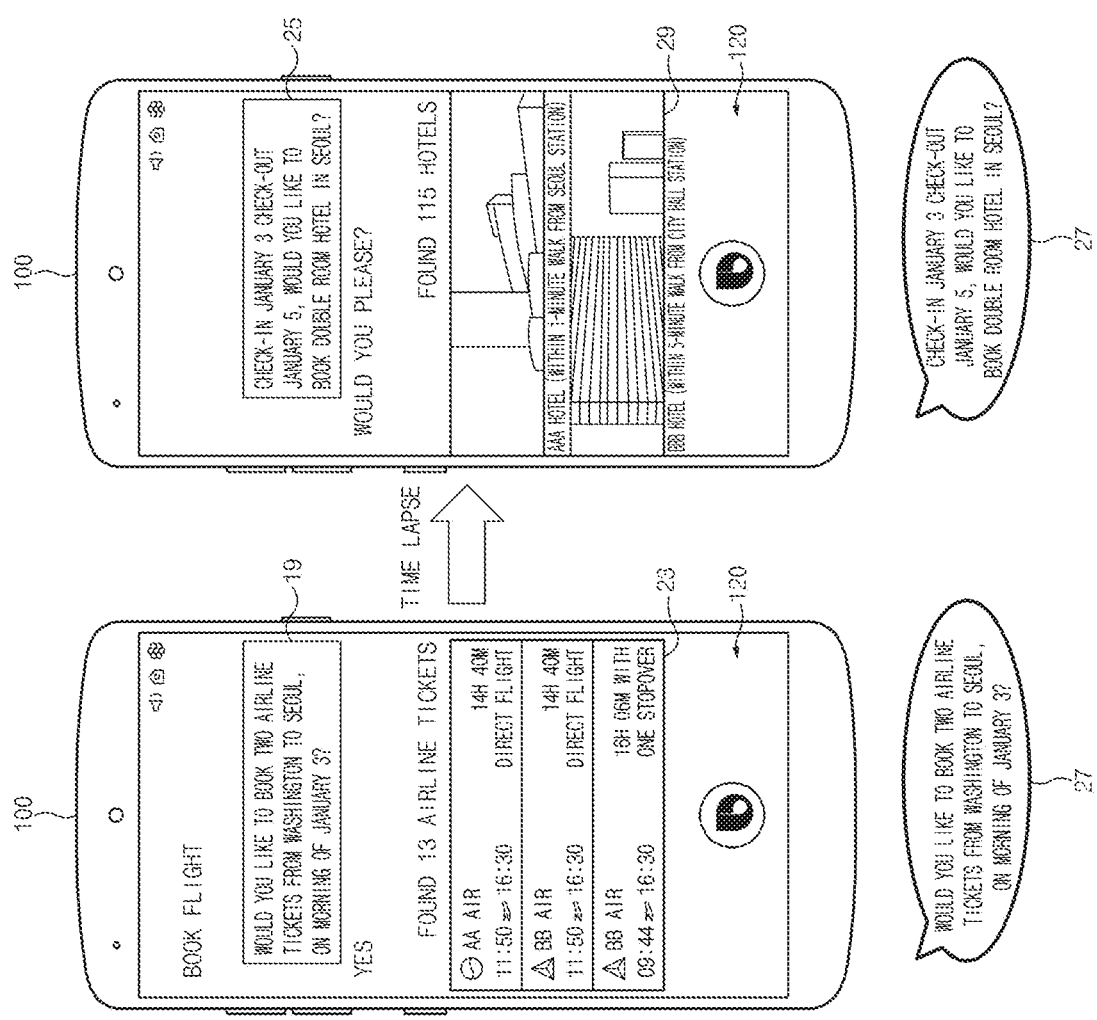
FIG. 8C is a view illustrating another response form of a user terminal according to the second embodiment.

FIG. 8A is a view illustrating a recording data processing form of an intelligence server according to the second embodiment. FIG. 8B is a view illustrating a response form of a user terminal according to the second embodiment. FIG. 8C is a view illustrating another response form of a user terminal according to the second embodiment.

Referring to FIG. 8A, the table 213 built on the ASR DB 211 of the intelligence server 200 may include at least one trigger information, at least one predicted utterance mapped onto each at least one trigger information, and at least one parameter information associated with at least one predicted utterance. According to an embodiment, the at least one trigger information and the at least one predicted utterance may be set to be similar to those described above through FIG. 7A; the at least one parameter information may be set as information required to perform a task associated with an utterance when the corresponding predicted utterance occurs. For example for the above descriptions, the at least one parameter information about the predicted utterance "please book a hotel" mapped onto trigger information 'hotel' may be set as information resources, such as a hotel name, reservation date, the number of guests, a price, a region, a room type, or the like, necessary to perform a task 'hotel reservation' when a user utterance corresponding to the predicted utterance occurs.

In an embodiment, the processor of the intelligence server 200 may control the ASR module 210 to convert the recording data received from the user terminal 100 into text data and then may compare the text data with the table 213.

In an operation of identifying trigger information (e.g. hotel) and predicted utterance (e.g. hotel reservation) corresponding to text data, the processor of the intelligence server 200 may collect at least one parameter information (e.g., a hotel name, reservation date, the number of guests, a price, a region, a room type, or the like) associated with the identified predicted utterance from the text data. The processor of the intelligence server 200 may deliver the identified predicted utterance and the collected at least one parameter information to the NLG module 250; the NLG module 250 may apply at least one parameter information to the received predicted utterance to generate feedback information (e.g., Check-in January 3 Check-out January 5, Would you like to book a double room hotel in Seoul?) in a text form corresponding to the predicted utterance. Alternatively, the NLG module 250 may deliver the generated feedback information in the text form to the TTS module 260; the TTS module 260 may convert the feedback information into a voice form. The processor of the intelligence server 200 may transmit, to the user terminal 100, the identified predicted utterance, the generated feedback information in the form of a text or a voice, and the collected at least one parameter information.

Referring to FIG. 8B, the processor 150 in FIG. 1B of the user terminal 100 may store the predicted utterance, the feedback information, and the at least one parameter information, which are received from the intelligence server 200, in the cache memory 173 of FIG. 3 inside the second wake-up recognition module 170 in FIG. 3. In this operation, to prepare at least part of the execution of a task (e.g., hotel reservation) according to the predicted utterance (e.g., book a hotel), the processor 150 may collect at least one information or content (e.g., hotel identification information, room information, preview image information, or the like), which is associated with the at least one parameter information. For example, the processor 150 may access an external server (e.g., a third party server of a hotel), may download information or content associated with the execution of the task, and may store the information or content in the cache memory 173. Alternatively, the processor 150 may obtain user information (e.g., user identification information, contact information, email information, or the like) associated with the execution of the task from the memory 173 and store the user information in the cache memory 173.

In an embodiment, the processor 150 may recognize the utterance (e.g., the command utterance mentioned above), which is received at the time after the speech recognition service function is activated, based on the ASR module 210 included in the intelligence agent 145 in FIG. 1B and may compare the recognized utterance with the predicted utterance on the cache memory 173. When the recognized utterance and the predicted utterance include the same words, phrases or morphemes to correspond to each other to be more than a specified ratio or to have the same grammatical meaning, the processor 150 may output (13) feedback information stored in the cache memory 173 in a form of texts on the display 120 or may output (15) in the form of a voice through a speaker 130 in FIG. 1B. At this time, when receiving the response to the output feedback information from a user, the processor 150 may output (17) the information or content, which is downloaded from an external server (e.g., a hotel server), through a content curation platform in a card form. In an embodiment, from the time after the speech recognition service function is activated to the time when the specified time has elapsed, when the user terminal 100 does not receive an utterance or the received at least one utterance does not correspond to the predicted utterance, the processor 150 may delete the predicted utterance, the feedback information, downloaded information, or content, which is stored in the cache memory 173.

Referring to FIGS. 8A and 8C, the recording data received by the intelligence server 200 from the user terminal 100 may include pieces of trigger information on the table 213. In this regard, the recorded user utterance (e.g., the daily utterance mentioned above) in the user terminal 100 may include the second trigger information (e.g., an airplane) generated by the activation of the recording function and other second trigger information (e.g., a hotel) uttered after the second trigger information (e.g., an airplane). Accordingly, in an operation of converting the recording data received from the user terminal 100 into text data and comparing the converted text data with the table 213, the processor of the intelligence server 200 may identify pieces of trigger information (e.g., an airplane and a hotel) corresponding to the text data. In this case, in the first order, the processor of the intelligence server 200 may perform the identifying of the predicted utterance for preceding trigger information (e.g., an airplane), the generating of the feedback information, and the collecting of at least one parameter information among the identified pieces of trigger information (e.g., an airplane and a hotel); the processor of the intelligence server 200 may transmit the identified predicted utterance (e.g., please book a ticket), the collected at least one parameter information (e.g., date (on the morning of January 3), region (from Washington to Seoul), the number of people (2), or the like), and the generated feedback information (e.g., Would you like to book two airline tickets from Washington to Seoul, on the morning of January 3?) to the user terminal 100. Furthermore, in the second order, the processor of the intelligence server 200 may identify, collect, or generate predicted utterance (e.g., please book a hotel), at least one parameter information (e.g., region (Seoul), date (check-in January 3, check-out January 5), the number of people (2), or the like), and feedback information (e.g., check-in January 3, check-out January 5, would you like to book a double room hotel in Seoul?) for trigger information (e.g., a hotel) of afterwards among the identified pieces of trigger information (e.g., an airplane and a hotel) and may transmit the predicted utterance, the at least one parameter information, and the feedback information to the user terminal 100.

In an embodiment, the processor 150 of the user terminal 100 may store a plurality of predicted utterances, pieces of feedback information, and pieces of parameter information, which are received from the intelligence server 200 in the first and second orders, in the cache memory 173. Moreover, the processor 150 may download at least one information or content, which is required to perform tasks (e.g., airline reservations and hotel reservations) according to the plurality of predicted utterances with reference to the pieces of parameter information from an external server and may store the at least one information or content in the cache memory 173.

In an embodiment, the processor 150 may recognize the utterance (e.g., the command utterance mentioned above), which is received at a time after the speech recognition service function is activated on the user terminal 100, through the voice recognition module of the intelligence agent 145 and may compare the recognized utterance with a plurality of predicted utterances stored in the cache memory 173. When the recognized utterance corresponds to any one of a plurality of predicted utterances (e.g., book a ticket), the processor 150 may output (19) feedback information (e.g., "Would you like to book two airline tickets from Washington to Seoul on the morning of January 3?") about the predicted utterance in a text form on the display 120 or may output (21) the feedback information in a voice form. Also, when receiving a user's response to the feedback information, the processor 150 may output (23) information or content, which is downloaded from an external server (e.g., airline server), through a card-type platform. In this operation, regardless of receiving an additional user utterance (e.g., the command utterance mentioned above), after the specified time elapses from the output (23) of information or content, the processor 150 may output (25 or 27) the remaining feedback information (e.g., check-in January 3 check-out January 5, would you like to book a double room hotel in Seoul?") in the cache memory 173. When the user response to the remaining feedback information occurs, the processor 150 may output (29) information or content, which is associated with the remaining feedback information, through a card-type platform similarly to the above descriptions. As such, the processor 150 may additionally provide information or content for the predicted utterance (e.g., hotel reservation) in addition to an actually-occurring user utterance (e.g., "book a ticket"), and thus may perform a task (e.g., hotel reservation) associated with a task (e.g., ticket reservation) intended by the user without a separate user command. Alternatively, after the processor 150 outputs a response (e.g., outputting feedback information or outputting related information or content) to the actually-occurring user utterance (e.g., "book a ticket"), when no additional user utterance occurs during a specified time, the processor 150 may delete predicted utterance, related feedback information, and related information or content, which does not actually-occur, from the cache memory 173.

Figure 9:
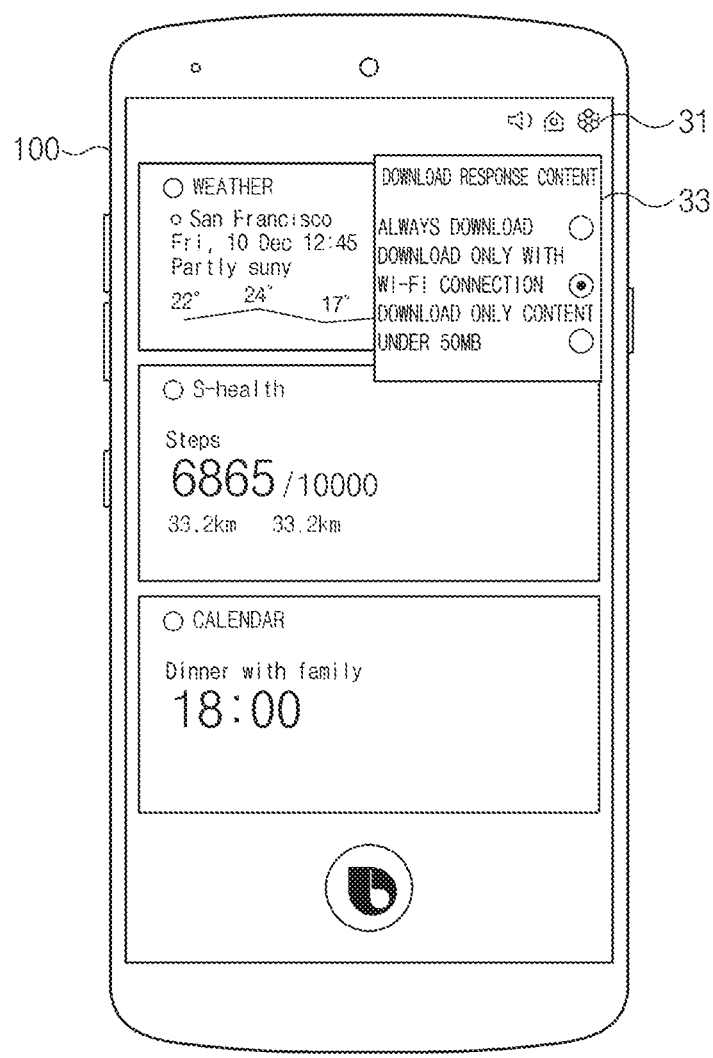
FIG. 9 is a view illustrating a speech recognition service setting screen of a user terminal according to an embodiment.

FIG. 9 is a view illustrating a speech recognition service setting screen of a user terminal according to an embodiment.

Referring to FIG. 9, in downloading information or content from the external server described above, the processor 150 in FIG. 1B of the user terminal 100 may identify data download method information of the user terminal 100 set by a user. In this regard, a specific menu 31 (e.g., a setting menu) that supports the setting of the data download method of the user terminal 100 may be included on the system setting screen of the user terminal 100; when a user input (e.g., a touch) is applied to the specific menu 31, an interface 33 capable of setting various download methods may be output. According to an embodiment, the data download method of the user terminal 100 described above may be information according to operation of a speech recognition service function or setting information referred only upon downloading content.

According to an embodiment, in an operation of downloading related information or content based on at least one parameter information received from the intelligence server 200 in FIG. 2, the processor 150 may identify a data download method selected by a user, may perform download without limitation depending on the identified data download method information or only download specific information or content (e.g., information or content below a specified capacity), or perform only the download in a specific environment (e.g., Wi-Fi environment).

According to the above-described various embodiments, an electronic device (e.g., the user terminal 100 of FIG. 3) supporting a speech recognition service may include a communication module (e.g., the communication module 180 of FIG. 3) communicating with at least one external device, a microphone (e.g., the microphone 111 of FIG. 3) receiving a voice input according to a user utterance, a first wake-up recognition module (e.g., the first wake-up recognition module 160 of FIG. 3) activating a function of the speech recognition service, a second wake-up recognition module (e.g., the second wake-up recognition module 170 of FIG. 3) activating a recording function for the user utterance, a memory (e.g., the memory 140 of FIG. 3) storing at least one trigger information associated with activation of the function of the speech recognition service or the recording function, and a processor (e.g., the processor 150 of FIG. 3) electrically connected to the communication module, the microphone, the first wake-up recognition module, the second wake-up recognition module, and the memory.

According to various embodiments, the processor may be configured to receive a first user utterance through the microphone, to recognize the first user utterance based on at least one of the first wake-up recognition module or the second wake-up recognition module, when the recognized first user utterance includes specified at least one first trigger information, to record at least part of the first user utterance by activating the recording function, to transmit recorded data to a first external device (e.g., the intelligence server 200 of FIG. 1B) supporting an operation of the speech recognition service, and to receive at least one of second user utterance information, which is predicted to occur at a time after the function of the speech recognition service is activated by the first wake-up recognition module, or at least one response information associated with the second user utterance from the first external device.

According to various embodiments, the processor may compare the third user utterance with second user utterance information received from the first external device when receiving a third user utterance at a time after the function of the speech recognition service is activated.

According to various embodiments, the processor may output the at least one response information when the third user utterance corresponds to second user utterance information received from the first external device by more than a specified ratio.

According to various embodiments, the processor may further receive at least one parameter information required to perform a task associated with the second user utterance, from the first external device through the electronic device and may obtain at least one content associated with execution of the task based on the at least one parameter information from at least one second external device.

According to various embodiments, the processor may store at least one of the second user utterance information, the at least one response information, or the at least one content in a specified cache memory.

According to various embodiments, the electronic device may further include a display (e.g., the display 120 of FIG. 1B) and at least one speaker (e.g., the speaker 130 of FIG. 1B).

According to various embodiments, the processor may output at least one of the at least one response information or the at least one content through at least one of the display or the at least one speaker.

According to various embodiments, the processor may delete at least one of the second user utterance information, the at least one response information, or the at least one content from the cache memory when the third user utterance does not correspond to second user utterance information received from the first external device by more than a specified ratio.

According to various embodiments, the processor may set the first trigger information in response to user control or may set information, which is included on a history of the recorded user utterance by more than a specified threshold quantity, as the first trigger information to store the first trigger information.

According to various embodiments, the processor may perform talker recognition on the first user utterance and may maintain or stop recording for at least part of the first user utterance, based on the result of performing the talker recognition.

According to various embodiments, the processor may stop recording for at least part of the first user utterance when receiving a sound output from at least one third external device in the recording of at least part of the first user utterance.

Figure 10:
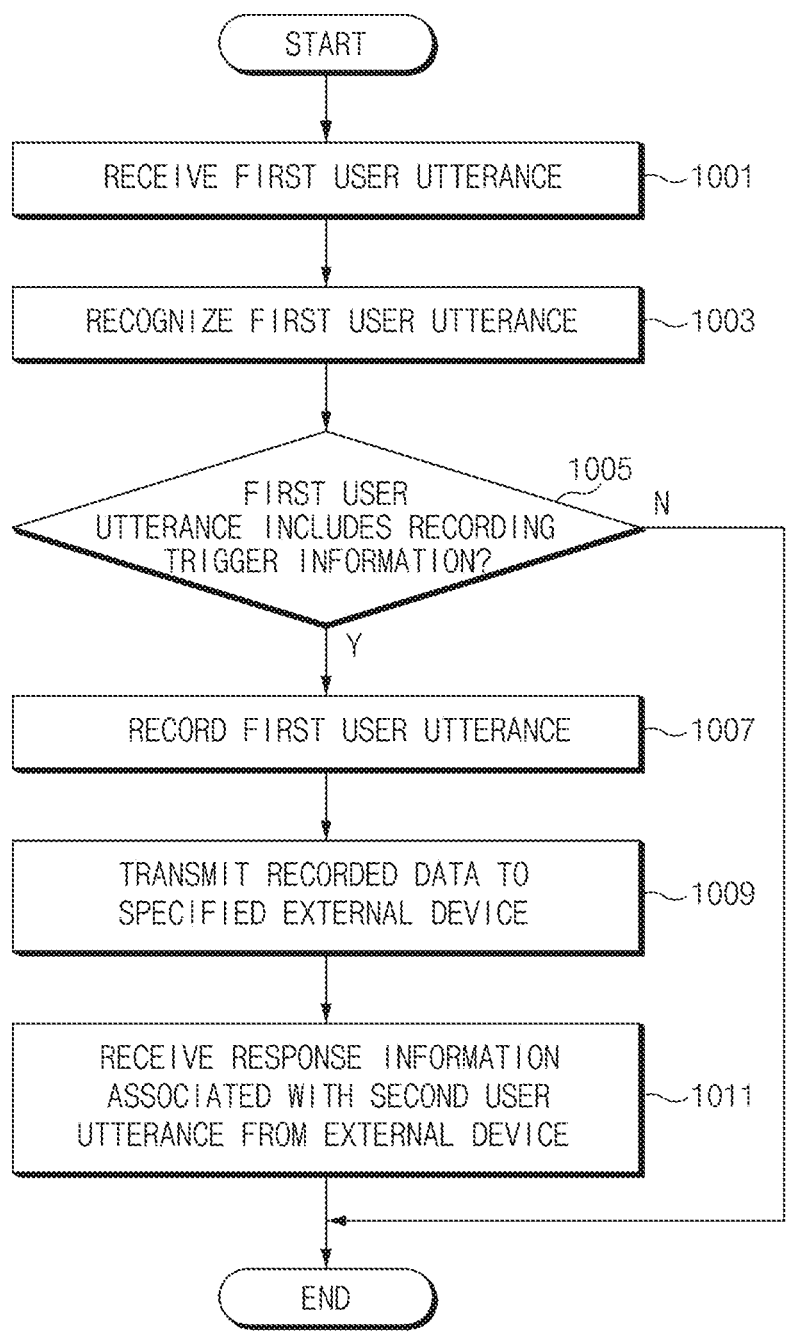
FIG. 10 is a diagram illustrating a user utterance response method of a user terminal according to an embodiment.

FIG. 10 is a diagram illustrating a user utterance response method of a user terminal according to an embodiment.

Referring to FIG. 10, in operation 1001, the processor 150 in FIG. 1D of the user terminal 100 in FIG. 1B may receive a user utterance occurring in the operating environment of the user terminal 100 through the microphone 111 in FIG. 1C mounted in a region. According to an embodiment, the user utterance may be an utterance (e.g., "Hi, Galaxy", "Hi, Bixby", or the like) for activating the speech recognition service function on the user terminal 100 or may be a daily utterance (e.g., the monologue of a user or the conversation with another person) that does not imply a specific command or intent associated with a task.

In operation 1003, the processor 150 may recognize the received user utterance, using at least one of the first wake-up recognition module 160 in FIG. 3 associated with the activation of the speech recognition service function or the second wake-up recognition module 170 in FIG. 3 associated with the activation of the recording function for the operating environment of the user terminal 100. For example, the processor 150 may control at least one of the first wake-up recognition module or the second wake-up recognition module to analyze information resources (e.g., words, phrases, morphemes, or the like) included in the user utterance.

In operation 1005, the processor 150 may control at least one of the first wake-up recognition module 160 or the second wake-up recognition module 170 to compare the information resource on the user utterance with at least one trigger information stored in the memory 140 in FIG. 1C. In this regard, the memory 140 may include at least one of at least one first trigger information for triggering the activation of the speech recognition service function on the user terminal 100 or at least one second trigger information for triggering the activation of a recording function.

According to an embodiment, when the information resource on the user utterance matches or corresponds to the first trigger information, the processor 150 may control the first wake-up recognition module 160 to activate a speech recognition service function.

When the information resource on the user utterance matches or corresponds to the second trigger information associated with the activation of the recording function in operation 1005, in operation 1007, the processor 150 may control the second wake-up recognition module 170 such that the recording function is activated and at least part of the user utterance is recorded. For example, at the time of activation of the recording function, the processor 150 may control the recording module 171 of FIG. 3 in the second wake-up recognition module 170 to record the user utterance received through the microphone 111 and to store the recorded data in the cache memory 173 of FIG. 3.

In operation 1009, the processor 150 may transmit the recorded data to the intelligence server 200 of FIG. 1D supporting the operation of the speech recognition service of the user terminal 100. For example, at the time when the active state of the recording function is transitioned to the inactive state or at the time when the specified time elapses from the transition, the processor 150 may access a communication network with the intelligence server 200 and may transmit the recorded data.

In operation 1011, the user terminal 100 may receive user utterance information, which is predicted to occur at the time after the activation of speech recognition service (or after receiving the user utterance corresponding to the recorded data), and response information for the predicted user utterance from the intelligence server 200. According to an embodiment, the response information may include feedback information in the form of text or voice corresponding to the predicted user utterance. Also, the user terminal 100 may further receive at least one parameter information required to perform a task associated with the predicted user utterance from the intelligence server 200. To prepare, in advance, at least part of the execution of a task according to the predicted user utterance, the processor 150 may download at least one content associated with the execution of the task from at least one external server based on the at least one parameter information. The processor 150 may store the predicted user utterance information received from the intelligence server 200, the response information, the at least one parameter information, or the content downloaded from an external server, in the cache memory 173.

In an embodiment, the processor 150 may determine whether to output the response information or content, by analyzing the user utterance received at the time after the speech recognition service function is activated on the user terminal 100. For example, the processor 150 may compare the user utterance, which is received after the activation of the speech recognition service function, with the predicted user utterance received from the intelligence server 200; when the user utterance corresponds to the predicted user utterance by more than a specified ratio or more or the user utterance and the predicted user utterance have the same grammatical meaning, the processor 150 may output response information. Furthermore, when the user of the user terminal 100 responds to the output of the response information, the processor 150 may output the downloaded content. On the other hand, when the user utterance received after the activation of the speech recognition service function (or after the user utterance corresponding to recorded data is received) does not correspond to the predicted user utterance or the user terminal 100 does not receive a separate user utterance from the time when the speech recognition service function is activated to the time when the specified time elapses, the processor 150 may delete at least one of the predicted user utterance, the response information, at least one parameter information, or the downloaded content, which is stored in the cache memory 173.

According to the above-described various embodiments, a user utterance response method of an electronic device supporting a speech recognition service may include receiving a first user utterance, recognizing the first user utterance, when the recognized first user utterance includes specified at least one first trigger information, recording at least part of the first user utterance, by activating a recording function included in the electronic device, transmitting recorded data to a first external device supporting an operation of the speech recognition service, and receiving at least one of second user utterance information, which is predicted to occur at a time after a function of the speech recognition service is activated on the electronic device, or at least one response information associated with the second user utterance from the first external device.

According to various embodiments, the user utterance response method may further include comparing the third user utterance with the second user utterance information when receiving a third user utterance at a time after the function of the speech recognition service is activated.

According to various embodiments, the comparing of the third user utterance with the second user utterance information may include outputting the at least one response information when the third user utterance corresponds to the second user utterance information by more than a specified ratio.

According to various embodiments, the user utterance response method may further include receiving at least one parameter information required to perform a task associated with the second user utterance from the first external device through the electronic device.

According to various embodiments, the receiving of the at least one parameter information may include obtaining at least one content associated with the execution of the task from at least one second external device based on the at least one parameter information.

According to various embodiments, the user utterance response method may further include storing at least one of the second user utterance information, the at least one response information, or the at least one content in a specified cache memory.

According to various embodiments, the outputting of the at least one response information may include outputting at least one of the at least one response information or the at least one content through at least one of the display or the at least one speaker included in the electronic device.

According to various embodiments, the comparing of the third user utterance with the second user utterance information may include deleting at least one of the second user utterance information, the at least one response information, or the at least one content from the cache memory when the third user utterance does not correspond to the second user utterance information by more than a specified ratio.

According to various embodiments, According to various embodiments, the user utterance response method may further include at least one of setting the first trigger information in response to user control or setting information, which is included on a history of the recorded user utterance by more than a specified threshold quantity, as the first trigger information to store the first trigger information.

According to various embodiments, the recognizing of the first user utterance may include performing talker recognition on the first user utterance and maintaining or stopping recording for at least part of the first user utterance, based on the result of performing the talker recognition.

According to various embodiments, the recording of the at least part of the first user utterance may include stopping recording for at least part of the first user utterance when receiving a sound output from at least one third external device in the recording of at least part of the first user utterance.

Figure 11:
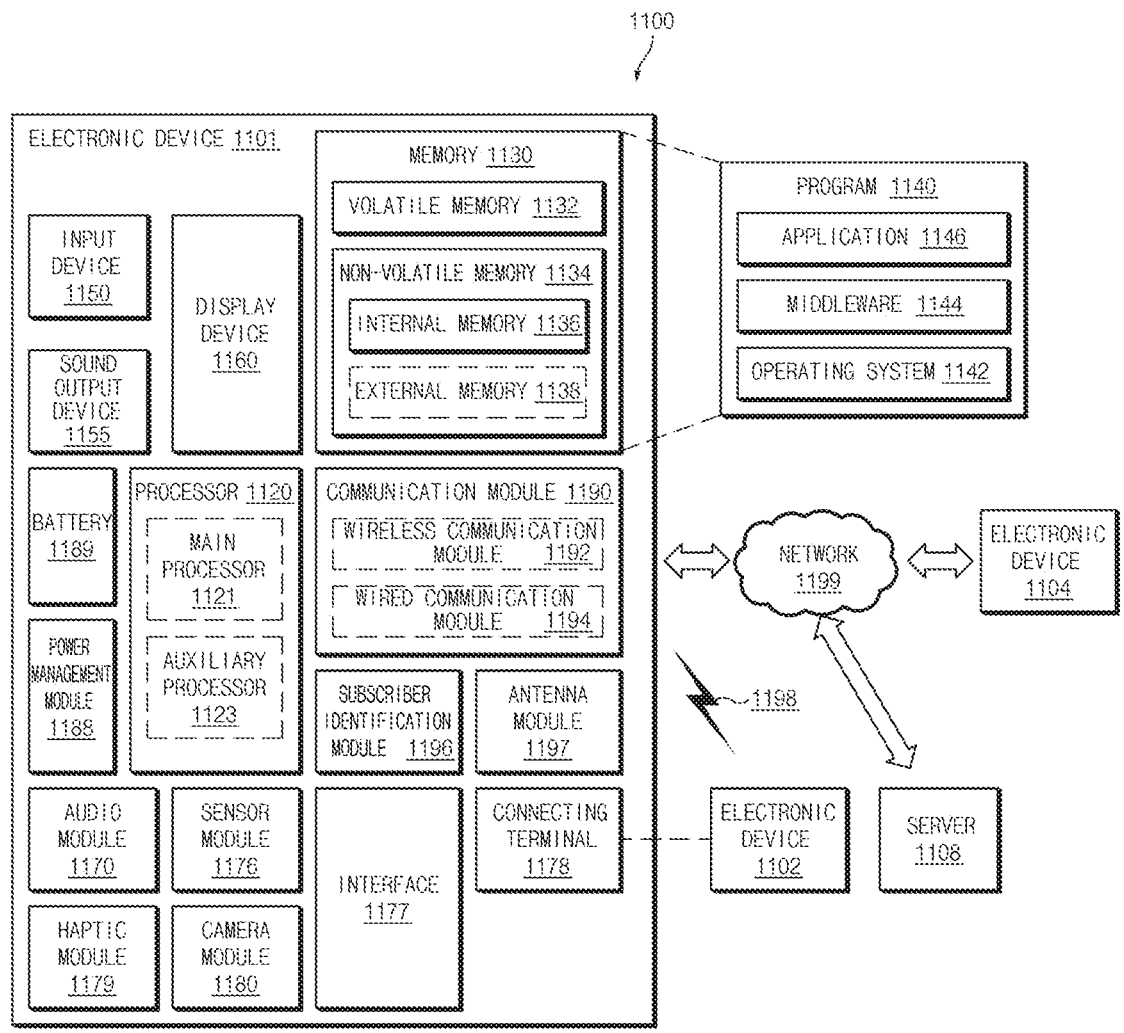
FIG. 11 is a diagram illustrating an electronic device in a network environment, according to an embodiment.

FIG. 11 is a diagram illustrating an electronic device in a network environment, according to an embodiment.

Referring to FIG. 11, an electronic device 1101 in a network environment 1100 may communicate with an electronic device 1102 over a first network 1198 (e.g., a short range wireless communication) or may communicate with an electronic device 1104 or a server 1108 over a second network 1199 (e.g., a long range wireless communication). The electronic device 1101 may communicate with the electronic device 1104 through the server 1108. According to an embodiment, the electronic device 1101 (e.g., the user terminal 100 of FIG. 3) may include a processor 1120 (e.g., the processor 150 of FIG. 3), a memory 1130 (e.g., the memory 140 of FIG. 3), an input device 1150 (e.g., the microphone 111 of FIG. 3), a sound output device 1155 (e.g., the speaker 130 of FIG. 1B), a display device 1160 (e.g., the display 120 of FIG. 1B), an audio module 1170, a sensor module 1176, an interface 1177, a haptic module 1179, a camera module 1180, a power management module 1188, a battery 1189, a communication module 1190, a subscriber identification module 1196, or an antenna module 1197. In any embodiment, the electronic device 1101 may not include at least one (e.g., the display device 1160 or the camera module 1180) of the above-described components or may further include one or more other components. In any embodiment, some of the components may be implemented as a single integrated circuit. For example, the sensor module 1176 (e.g., a fingerprint sensor, an iris sensor, or an illuminance sensor) may be implemented while being embedded in the display device 1160 (e.g., a display).

For example, the processor 1120 may execute software (e.g., a program 1140) to control at least another component (e.g., hardware or software component) of the electronic device 1101 connected to the processor 1120, and may process and calculate various types of data. According to an embodiment, as at least part of data processing or calculation, the processor 1120 may load instructions or data received from other components (e.g., the sensor module 1176 or the communication module 1190) into the volatile memory 1132, may process instructions or data stored in the volatile memory 1132, and may store the result data in the nonvolatile memory 1134. According to an embodiment, the processor 1120 may include a main processor 1121 (e.g., a central processing unit or an application processor) and an auxiliary processor 1123 (e.g., a graphic processing unit, an image signal processor, a sensor hub processor, or a communication processor) capable of operating independently or together with the main processor. Additionally or alternatively, the auxiliary processor 1123 may use lower power than main processor 1121 or may be configured to be specialized to a specified function. The auxiliary processor 1123 may be implemented separately from the main processor 1121 or as part of the main processor 1121.

For example, the auxiliary processor 1123 may control at least part of the functions or states associated with at least one (e.g., the display device 1160, the sensor module 1176, or the communication module 1190) of the components of the electronic device 1101, instead of the main processor 1121 while the main processor 1121 is in an inactive (e.g., sleep) state or together with the main processor 1121 while the main processor 1121 is in an active (e.g., the execution of an application) state. According to an embodiment, the auxiliary processor 1123 (e.g., an image signal processor or a communication processor) may be implemented as a part of operatively associated other components (e.g., the camera module 1180 or the communication module 1190).

The memory 1130 may store various pieces of data used by at least one component (e.g., the processor 1120 or the sensor module 1176) of the electronic device 1101. For example, data may include software (e.g., the program 1140) and input data or output data for instructions associated with the software. The memory 1130 may include, for example, the volatile memory 1132 or the nonvolatile memory 1134.

The program 1140 may be stored as software in the memory 1130 and may include, for example, an operating system 1142, a middleware 1144, or an application 1146.

The input device 1150 may receive instructions or data to be used for the component (e.g., the processor 1120) of electronic device 1101, from the outside (e.g., a user) of the electronic device 1101. For example, the input device 1150 may include a microphone, a mouse, or a keyboard.

The sound output device 1155 may output a sound signal to the outside of the electronic device 1101. The sound output device 1155 may include, for example, a speaker or a receiver. The speaker may be used for a general purpose, such as multimedia play or recording play, and the receiver may be used to receive an incoming call. According to an embodiment, the receiver may be implemented separately from the speaker or may be implemented as a part of the speaker.

The display device 1160 may visually provide information to the outside (e.g., the user) of the electronic device 1101. The display device 1160 may include, for example, a display, a hologram device, or a projector and a control circuit for controlling a corresponding device. According to an embodiment, the display device 1160 may include a touch circuitry configured to sense a touch, or a sensor circuitry (e.g., a pressure sensor) configured to measure the strength of force generated by the touch.

The audio module 1170 may convert sound to an electrical signal, or reversely, may convert an electrical signal to sound. According to an embodiment, the audio module 1170 may obtain sound through the input device 1150, or may output sound through the sound output device 1155, or through an external electronic device (e.g., the electronic device 1102) (e.g., a speaker or a headphone) directly or wirelessly connected with the electronic device 1101.

The sensor module 1176 may sense an operation state (e.g., power or a temperature) of the electronic device 1101 or an external environment state (e.g., a user state), and may generate an electrical signal or a data value corresponding the sensed state. According to an embodiment, the sensor module 1176 may include, for example, a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illumination sensor.

The interface 1177 may support one or more specified protocols that may be used to directly and wirelessly connect the electronic device 1101 with an external electronic device (e.g., the electronic device 1102). According to an embodiment, the interface 1177 may include, for example, a high definition multimedia interface (HDMI), a universal serial bus (USB) interface, a secure digital (SD) card interface, or an audio interface.

A connecting terminal 1178 may include a connector that may allow the electronic device 1101 to be physically connected with an external electronic device (e.g., the electronic device 1102). According to an embodiment, the connecting terminal 1178 may include, for example, a HDMI connector, a USB connector, a SD card connector, or an audio connector (e.g., a headphone connector).

The haptic module 1179 may convert an electrical signal to a mechanical stimulation (e.g., vibration or movement) or an electrical stimulation which the user may perceive through the sense of touch or the sense of movement. According to an embodiment, the haptic module 1179 may include, for example, a motor, a piezoelectric sensor, or an electrical stimulation device.

The camera module 1180 may photograph a still image and a video. According to an embodiment, the camera module 1180 may include one or more lenses, image sensors, image signal processors, or flashes (or electrical flashes).

The power management module 1188 may manage the power which is supplied to the electronic device 1101. According to an embodiment, the power management module 388 may be implemented, for example, as at least part of a power management integrated circuit (PMIC).

The battery 1189 may power at least one component of the electronic device 1101. According to an embodiment, the battery 1189 may include, for example, a primary cell not rechargeable, a secondary cell rechargeable, or a fuel cell.

The communication module 1190 may establish a direct (or wired) communication channel or a wireless communication channel between the electronic device 1101 and an external electronic device (e.g., the electronic device 1102, the electronic device 1104, or the server 1108) and may perform communication through the established communication channel. The communication module 1190 may include one or more communication processors which are operated independently of the processor 1120 (e.g., an application processor) and support direct (or wired) communication or wireless communication. According to an embodiment, the communication module 1190 may include a wireless communication module 1192 (e.g., a cellular communication module, a short range wireless communication module, or a global navigation satellite system (GNSS) communication module) or a wired communication module 1194 (e.g., a local area network (LAN) communication module or a power line communication module). A corresponding communication module of such communication modules may communicate with an external electronic device over the first network 1198 (e.g., a short range communication network such as Bluetooth, Wi-Fi direct, or infrared data association (IrDA)) or the second network 1199 (e.g., a long distance communication network such as a cellular network, an Internet, or a computer network (e.g., LAN or WAN)). The above-described kinds of communication modules may be integrated in one component (e.g., a single chip) or may be implemented with a plurality of components (e.g., a plurality of chips) which are independent of each other. The wireless communication module 1192 may identify and authenticate the electronic device 1101 within a communication network, such as the first network 1198 or the second network 1199, by using subscriber information (e.g., international mobile subscriber identity (IMSI)) stored in the subscriber identification module 1196.

The antenna module 1197 may transmit a signal or a power to the outside (e.g., an external electronic device) or may receive a signal or a power from the outside. According to an embodiment, the antenna module 1197 may include one or more antennas; As such, at least one antenna suitable for a communication scheme used in a communication network such as the first network 1198 or the second network 1199 may be selected, for example, by the communication module 1190. The signal or power may be exchanged between the communication module 1190 and an external electronic device through the selected at least one antenna or may be received from the external electronic device through the selected at least one antenna and the communication module 190.

At least part of the components may be connected to each other through a communication scheme (e.g., a bus, a general purpose input and output (GPIO), a serial peripheral interface (SPI), or a mobile industry processor interface (MIPI)) between peripheral devices and may exchange signals (e.g., commands or data) with each other.

According to an embodiment, a command or data may be transmitted or received (or exchanged) between the electronic device 1101 and the external electronic device 1104 through the server 1108 connected to the second network 1199. Each of the electronic devices 1102 and 1104 may be a device of which the type is different from or the same as that of the electronic device 1101. According to an embodiment, all or a part of operations to be executed in the electronic device 1101 may be executed in one or more external devices of the external electronic devices 1102, 1104, or 1108. For example, when the electronic device 1101 should perform any function or service automatically or in response to a request from the user or any other device, the electronic device 1101 may additionally request one or more external electronic devices to perform at least part of the function or service, instead of internally executing the function or service. The one or more external electronic devices which receive the request may execute at least a part of the function or service thus requested or an additional function or service associated with the request, and may provide a result of the execution to the electronic device 1101. The electronic device 1101 may process the result as it is or additionally, and may provide the processed result as at least part of the response to the request. To this end, for example, a cloud computing, distributed computing, or client-server computing technology may be used.

According to various embodiments disclosed in the disclosure, the electronic device may include various types of devices. The electronic device may include, for example, a portable communication device (e.g., a smartphone), a computer device, a portable multimedia device, a mobile medical appliance, a camera, a wearable device, or a home appliance. An electronic device according to an embodiment of the disclosure may not be limited to the above-described electronic devices.

Various embodiments of the disclosure and terms used herein are not intended to limit the technical features described in the disclosure to specific embodiments, and it should be understood that the embodiments and the terms include modification, equivalent, or alternative on the corresponding embodiments described herein. With regard to description of drawings, similar or related components may be marked by similar reference marks/numerals. The singular form of the noun corresponding to an item may include one or more of items, unless interpreted otherwise in context. In the disclosure, the expressions "A or B", "at least one of A and B", "at least one of A or B", "A, B, or C", "at least one of A, B, and C", and "at least one of A, B, or C" may include all combinations of the associated listed items. The terms, such as "first" or "second" may be used to simply distinguish the corresponding component from the other component, but do not limit the corresponding components in other aspects (e.g., importance or order). When a component (e.g., a first component) is referred to as being "coupled with/to" or "connected to" another component (e.g., a second component) with or without the term of "operatively" or "communicatively", it may mean that a component is connectable to the other component, directly (e.g., by wire), wirelessly, or through the third component.

The term "module" used herein may include a unit, which is implemented with hardware, software, or firmware, and may be interchangeably used with the terms "logic", "logical block", "part", "circuit", or the like. The "module" may be a minimum unit of an integrated part or may be a minimum unit of the part for performing one or more functions or a part thereof. For example, according to an embodiment, the module may be implemented in the form of an application-specific integrated circuit (ASIC).

Various embodiments of the disclosure may be implemented with software (e.g., program 1140) including one or more instructions stored in a storage medium (e.g., the internal memory 1136 or the external memory 1138) readable by a machine (e.g., the electronic device 1101). For example, the processor (e.g., the processor 1120) of the machine (e.g., the electronic device 1101) may call at least one instruction of the stored one or more instructions from a storage medium and then may execute the at least one instruction. This enables the machine to operate to perform at least one function depending on the called at least one instruction. The one or more instructions may include a code generated by a complier or a code executable by an interpreter. The machine-readable storage medium may be provided in the form of a non-transitory storage medium. Herein, 'non-transitory' just means that the storage medium is a tangible device and does not include a signal (e.g., electromagnetic waves), and this term does not distinguish between the case where data is semi permanently stored in the storage medium and the case where the data is stored temporarily.

According to an embodiment, a method according to various embodiments disclosed herein may be provided to be included in a computer program product. The computer program product may be traded between a seller and a buyer as a product. The computer program product may be distributed in the form of a machine-readable storage medium (e.g., compact disc read only memory (CD-ROM)) or may be distributed (e.g., downloaded or uploaded), through an application store (e.g., PlayStore™), directly between two user devices (e.g., smartphones), or online. In the case of on-line distribution, at least part of the computer program product may be at least temporarily stored in the machine-readable storage medium such as the memory of a manufacturer's server, an application store's server, or a relay server or may be generated temporarily.

According to various embodiments, each component (e.g., a module or a program) of the above-described components may include a single entity or a plurality of entities. According to various embodiments, one or more of the components of the above-described components or operations may be omitted, or one or more other components or operations may be added. Alternatively or additionally, a plurality of components (e.g., a module or a program) may be integrated into one component. In this case, the integrated component may perform one or more functions of each component of the plurality of components in the manner same as or similar to being performed by the corresponding component of the plurality of components prior to the integration. According to various embodiments, operations executed by modules, program, or other components may be executed by a successive method, a parallel method, a repeated method, or a heuristic method, or one or more of the operations may be executed in different sequences or omitted. Alternatively, one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:
1. An electronic device supporting a speech recognition service, the electronic device comprising:
a communication module configured to communicate with at least one external device;
a microphone configured to receive a voice input according to a user utterance;
a first wake-up recognition module configured to activate a function of the speech recognition service;
a second wake-up recognition module configured to activate a recording function for the user utterance;
a memory configured to store at least one trigger information associated with activation of the function of the speech recognition service or the recording function; and
a processor electrically connected to the communication module, the microphone, the first wake-up recognition module, the second wake-up recognition module, and the memory,
wherein the processor is configured to:
receive a first user utterance through the microphone, recognize the first user utterance based on at least one of the first wake-up recognition module or the second wake-up recognition module,
when the recognized first user utterance includes at least one first trigger information, record at least part of the first user utterance by activating the recording function, transmit recorded data through the communication module to a first external device supporting an operation of the speech recognition service, and receive at least one of second user utterance information, which is predicted to occur at a time after the function of the speech recognition service is activated by the first wake-up recognition module, or at least one response information associated with the second user utterance from the first external device through the communication module,
when receiving a third user utterance at the time after the function of the speech recognition service is activated, compare the third user utterance with the second user utterance information received from the first external device,
when the third user utterance corresponds to the second user utterance information received from the first external device by more than a specified ratio, output the at least one response information, and
receive at least one parameter information required to perform a task associated with the second user utterance, from the first external device through the electronic device, and obtain at least one content associated with execution of the task based on the at least one parameter information from at least one second external device.

2. The electronic device of claim 1, wherein the processor is configured to:
store at least one of the second user utterance information, the at least one response information, or the at least one content in a specified cache memory.

3. The electronic device of claim 2, wherein the processor is configured to:
when the third user utterance does not correspond to the second user utterance information received from the first external device by more than a specified ratio, delete at least one of the second user utterance information, the at least one response information, or the at least one content from the cache memory.

4. The electronic device of claim 1, further comprising:
a display; and
at least one speaker,
wherein the processor is configured to:
output at least one of the at least one response information or the at least one content through at least one of the display or the at least one speaker.

5. The electronic device of claim 1, wherein the processor is configured to:
set the first trigger information in response to user control; or
set information, which is included on a history of the recorded user utterance by more than a specified threshold quantity, as the first trigger information to store the first trigger information.

6. The electronic device of claim 1, wherein the processor is configured to:
perform talker recognition on the first user utterance; and
maintain or stop recording for at least part of the first user utterance, based on the result of performing the talker recognition.

7. The electronic device of claim 1, wherein the processor is configured to:
in the recording of at least part of the first user utterance, when receiving a sound output from at least one third external device, stop recording for at least part of the first user utterance.

8. A user utterance response method of an electronic device supporting a speech recognition service, the method comprising:
receiving a first user utterance;
recognizing the first user utterance;
when the recognized first user utterance includes at least one first trigger information, recording at least part of the first user utterance, by activating a recording function included in the electronic device;
transmitting recorded data to a first external device supporting an operation of the speech recognition service;
receiving at least one of second user utterance information, which is predicted to occur at a time after a function of the speech recognition service is activated on the electronic device, or at least one response information associated with the second user utterance from the first external device;
receiving a third user utterance at the time after the function of the speech recognition service is activated;
comparing the third user utterance with the second user utterance information received from the first external device;
when the third user utterance corresponds to the second user utterance information received from the first external device by more than a specified ratio, outputting the at least one response information,
receiving at least one parameter information required to perform a task associated with the second user utterance, from the first external device through the electronic device; and
obtaining at least one content associated with execution of the task based on the at least one parameter information from at least one second external device.

9. The method of claim 8, further comprising at least one of:
setting the first trigger information in response to user control; or
setting information, which is included on a history of the recorded user utterance by more than a specified threshold quantity, as the first trigger information.

10. The method of claim 8, wherein recognizing the first user utterance includes:
   performing talker recognition on the first user utterance; and
   maintaining or stopping recording for at least part of the first user utterance based on the result of performing the talker recognition.

11. The method of claim 8, wherein recording the at least part of the first user utterance includes:
   when receiving a sound output from at least one third external device, stopping recording for at least part of the first user utterance.

* * * * *